United States Patent [19]

Kikuchi

[11] Patent Number: 5,042,926
[45] Date of Patent: Aug. 27, 1991

[54] ZOOM LENS AND FOCUSING METHOD

[75] Inventor: Shuichi Kikuchi, Yokohama, Japan

[73] Assignee: Ricoh Company, Ltd., Tokyo, Japan

[21] Appl. No.: 468,264

[22] Filed: Jan. 22, 1990

[30] Foreign Application Priority Data

| Jan. 23, 1989 [JP] | Japan | 1-13548 |
| Apr. 5, 1989 [JP] | Japan | 1-86374 |
| Dec. 27, 1989 [JP] | Japan | 1-341978 |

[51] Int. Cl.$^5$ .................................. G02B 15/00
[52] U.S. Cl. ............................. 359/684; 359/689; 359/676
[58] Field of Search ............... 350/423, 427, 474, 476

[56] References Cited

U.S. PATENT DOCUMENTS

| 4,198,127 | 4/1980 | Itoh | 350/423 |
| 4,636,040 | 1/1987 | Tokumaru | 350/427 |
| 4,955,700 | 9/1990 | Yamaguchi | 350/423 |

Primary Examiner—Paul M. Dzierzynski
Attorney, Agent, or Firm—Oblon, Spivak, McClelland, Maier & Neustadt

[57] ABSTRACT

A zoom lens comprises first to third lens groups sequentially arranged from an object side toward an image side and respectively having negative, positive and negative focal distances; a first zoom region for performing a zooming operation from a wide angle side to a telescopic side by moving at least the first lens group onto the image side; and a second zoom region for performing the zooming operation from the wide angle side to the telescopic side by moving all the lens groups onto the object side further from the telescopic end of the first zoom region while the distances between the lens groups are changed with respect to each other; the focal distances of the respective lens groups and the focal distance of the entire lens system at the wide angle end satisfying predetermined inequality conditions. A focusing method in the above zoom lens comprises the steps of performing a focusing operation by moving the second lens group on an optical axis in the first zoom region; and performing the focusing operation by moving the first lens group on the optical axis in the second zoom region.

6 Claims, 33 Drawing Sheets

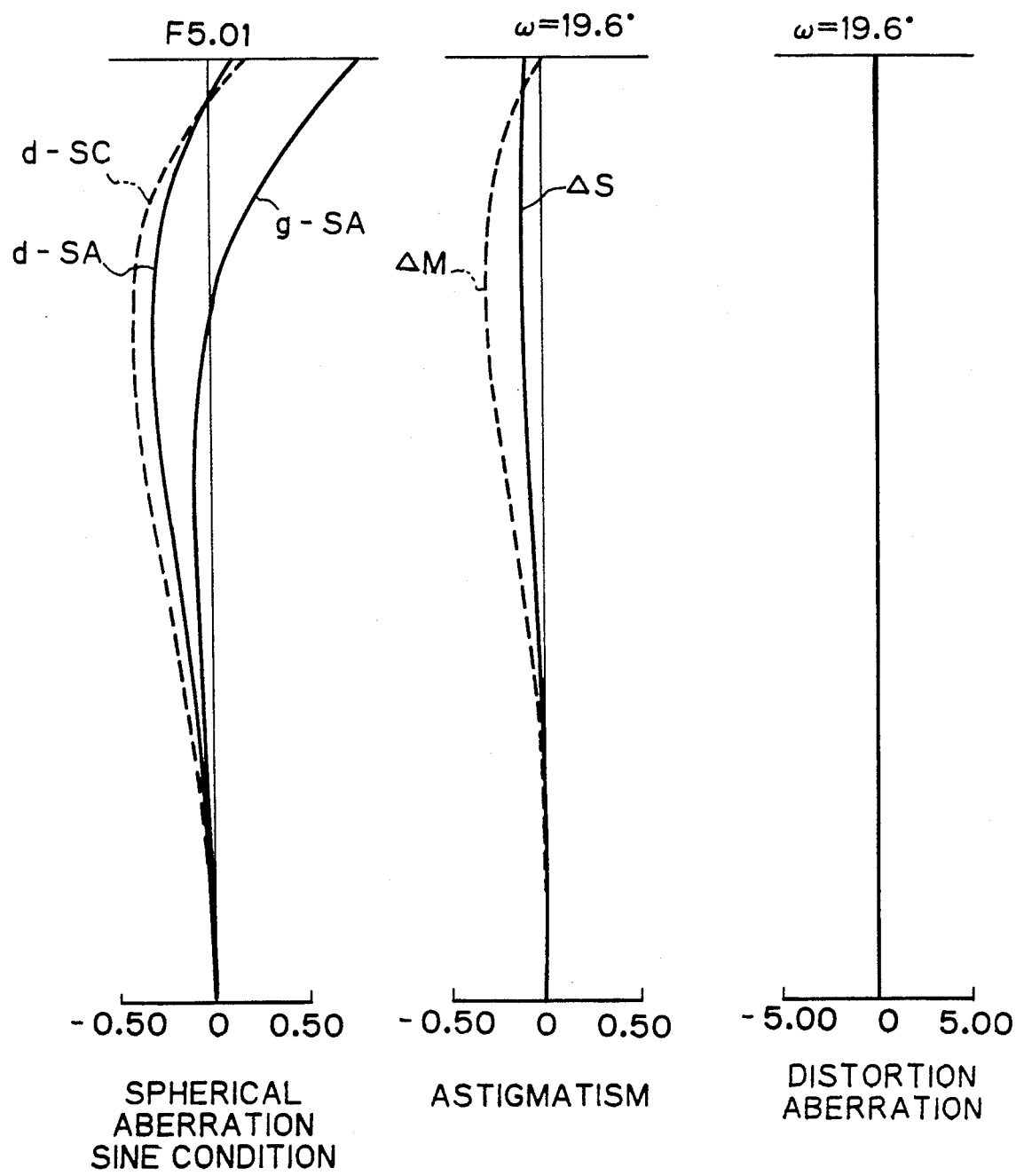

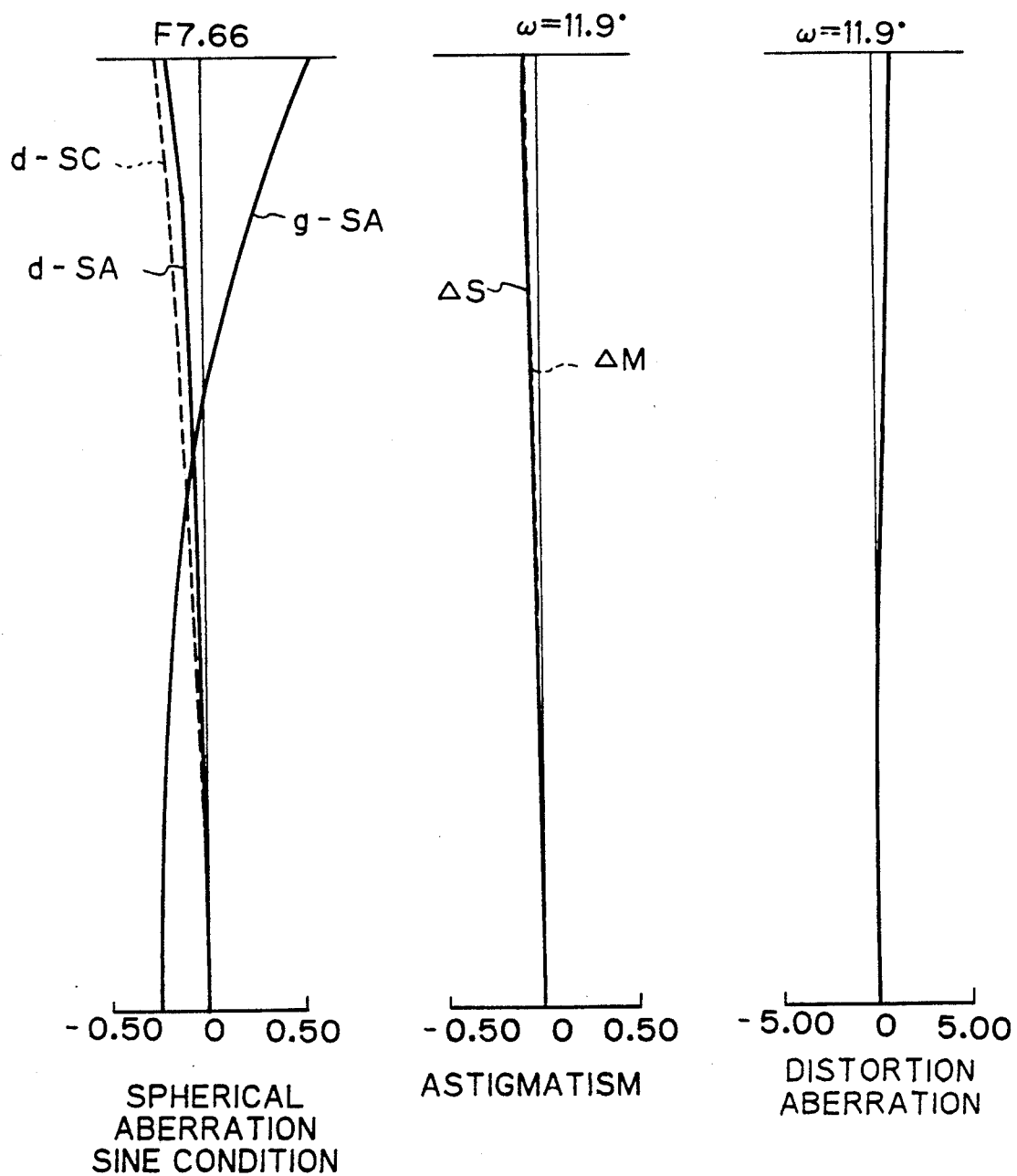

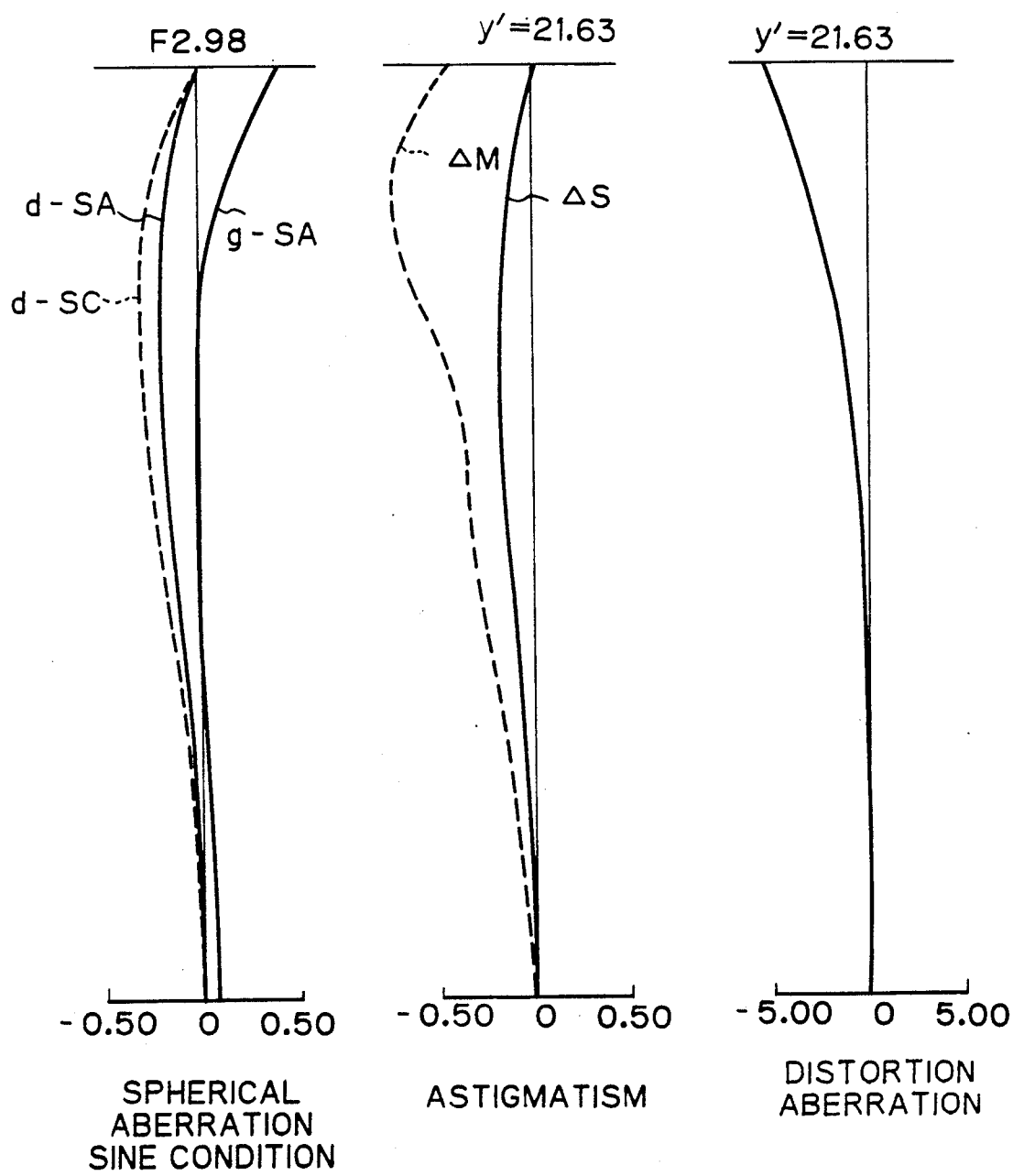

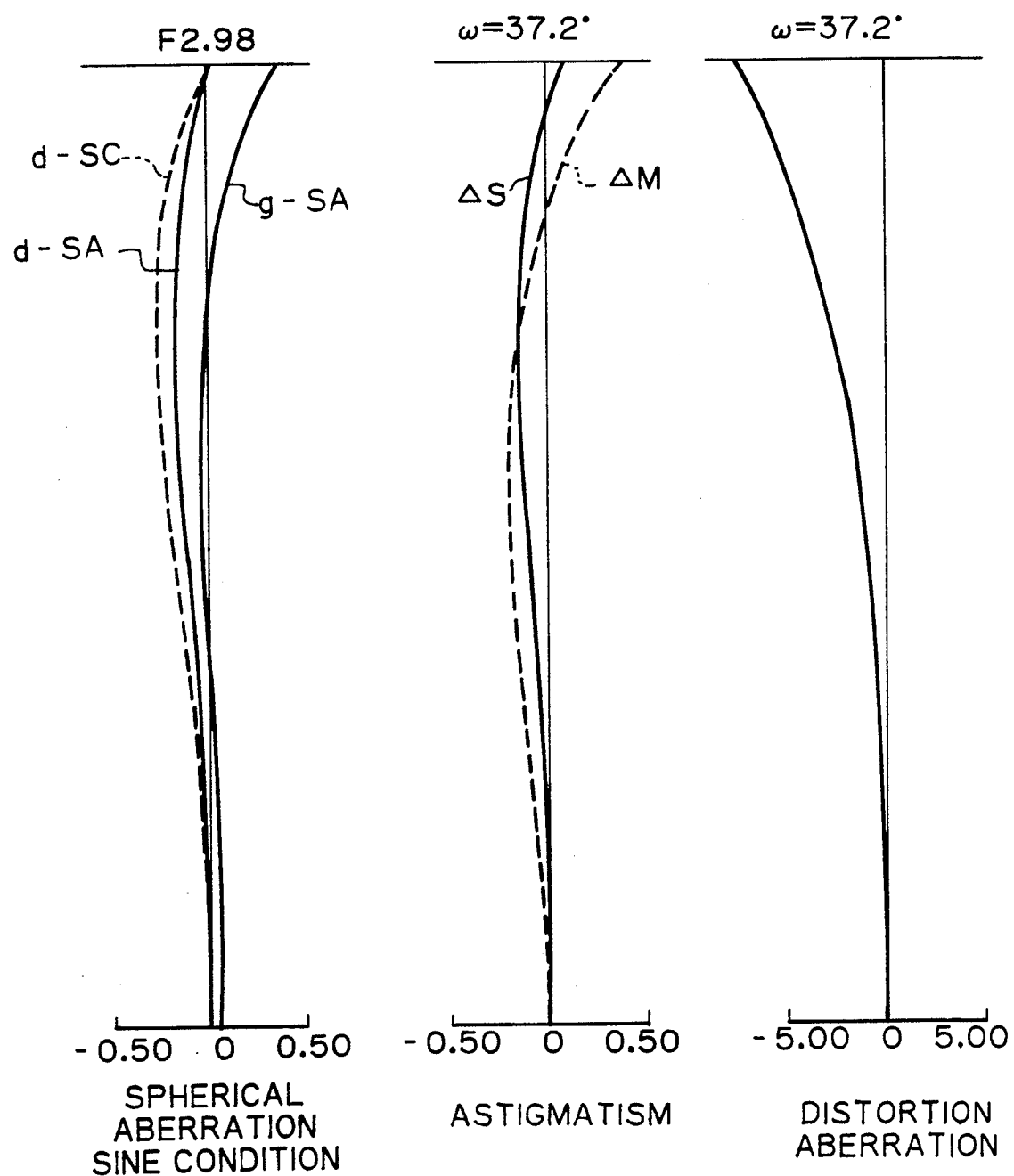

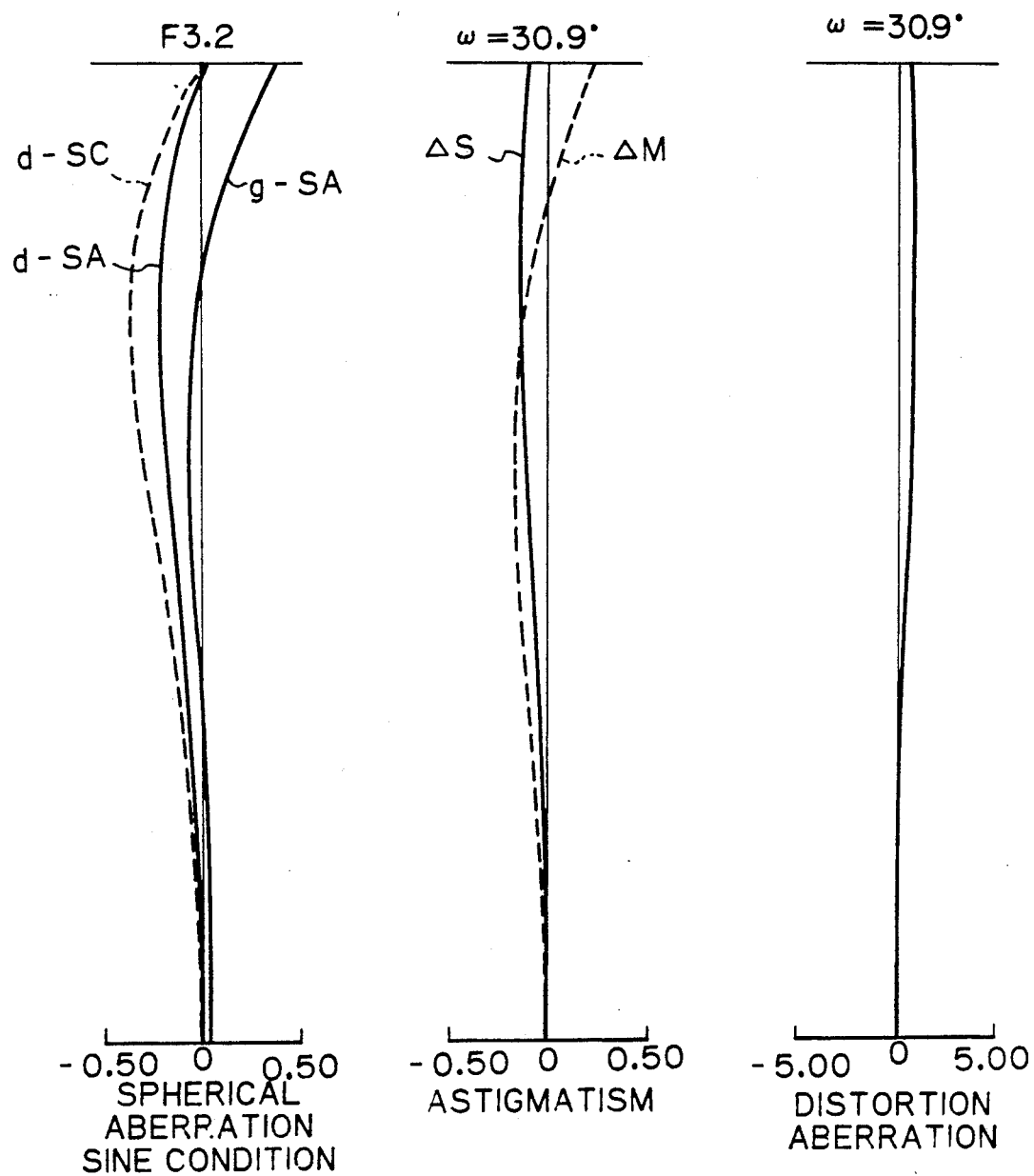

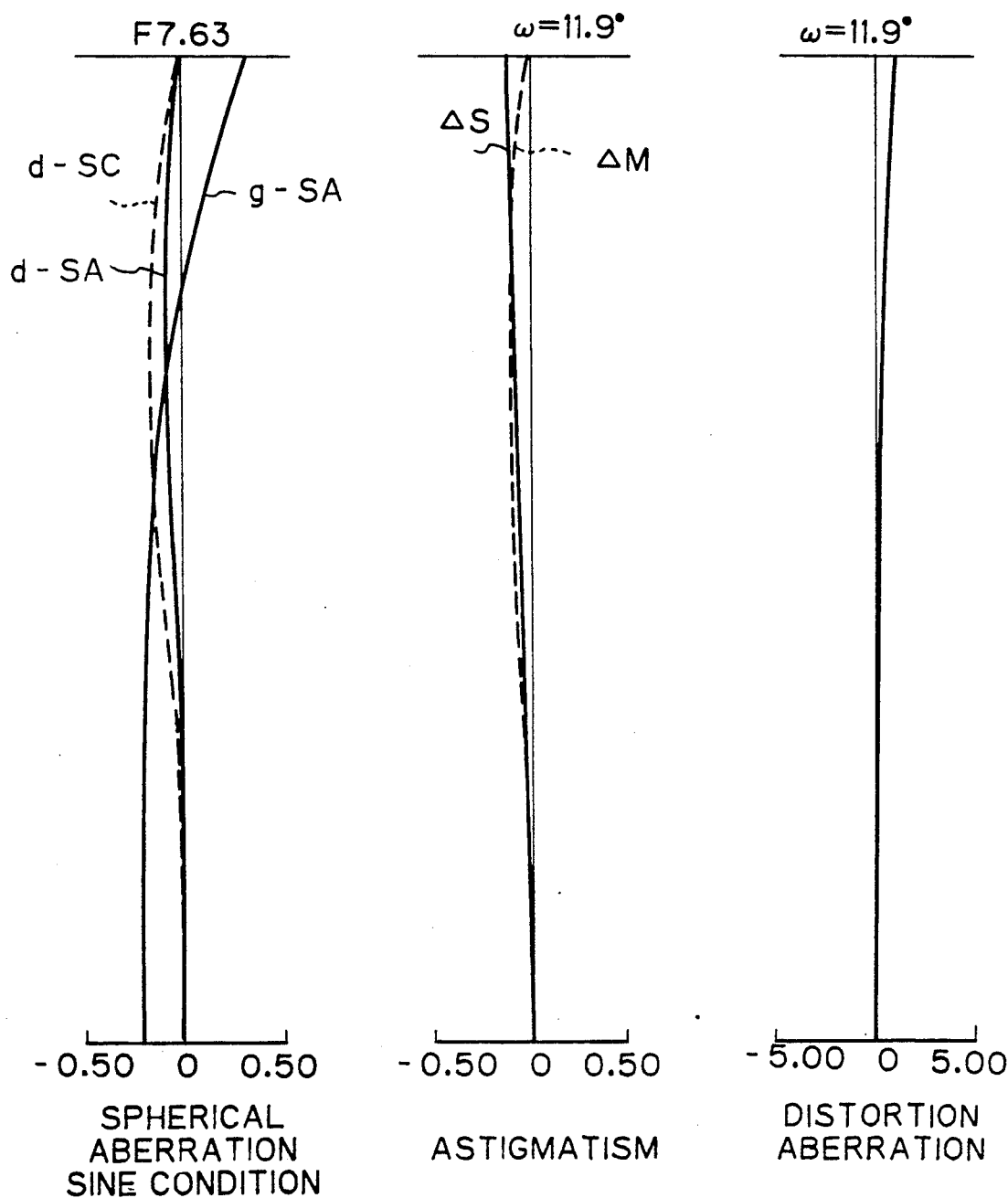

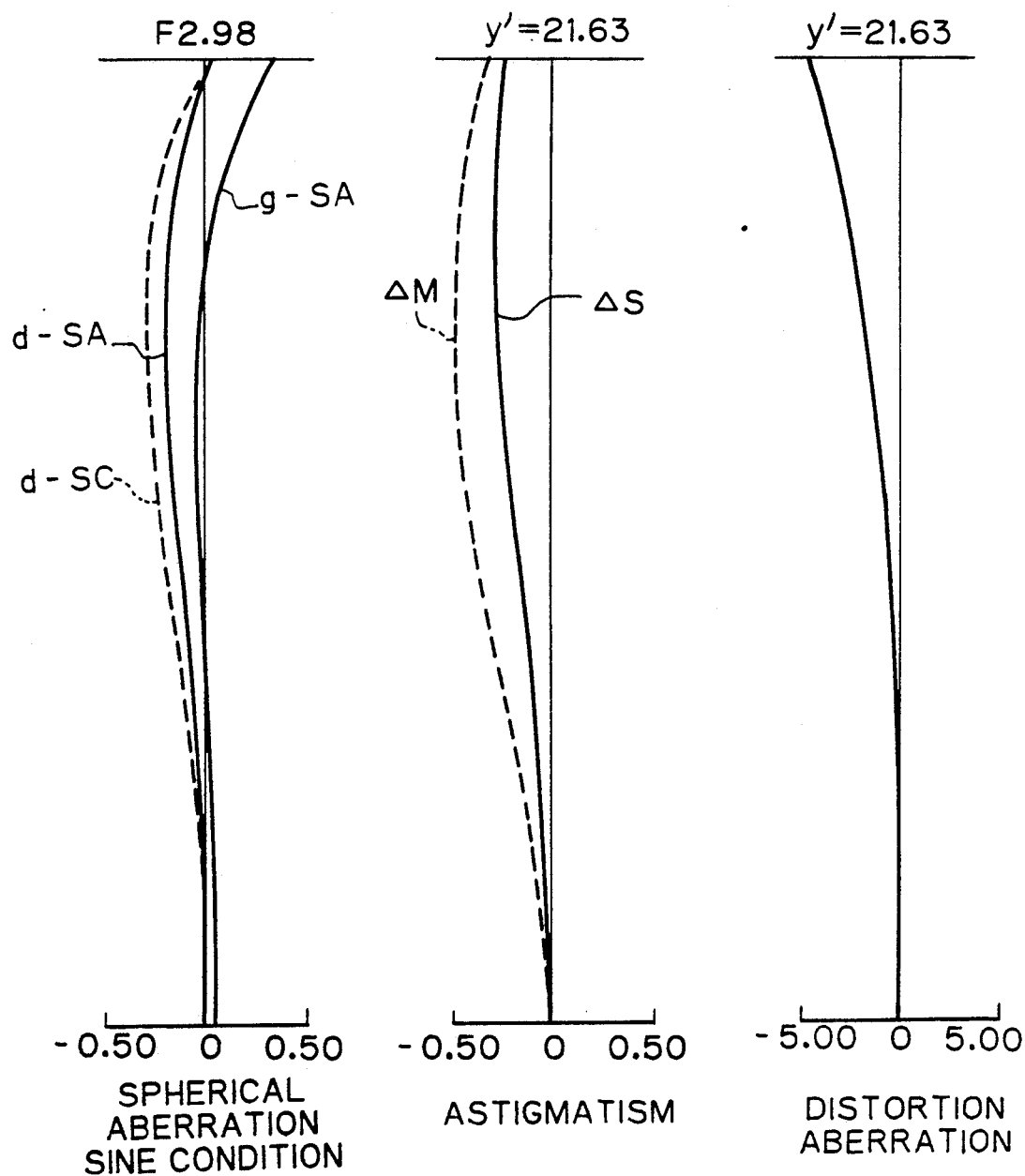

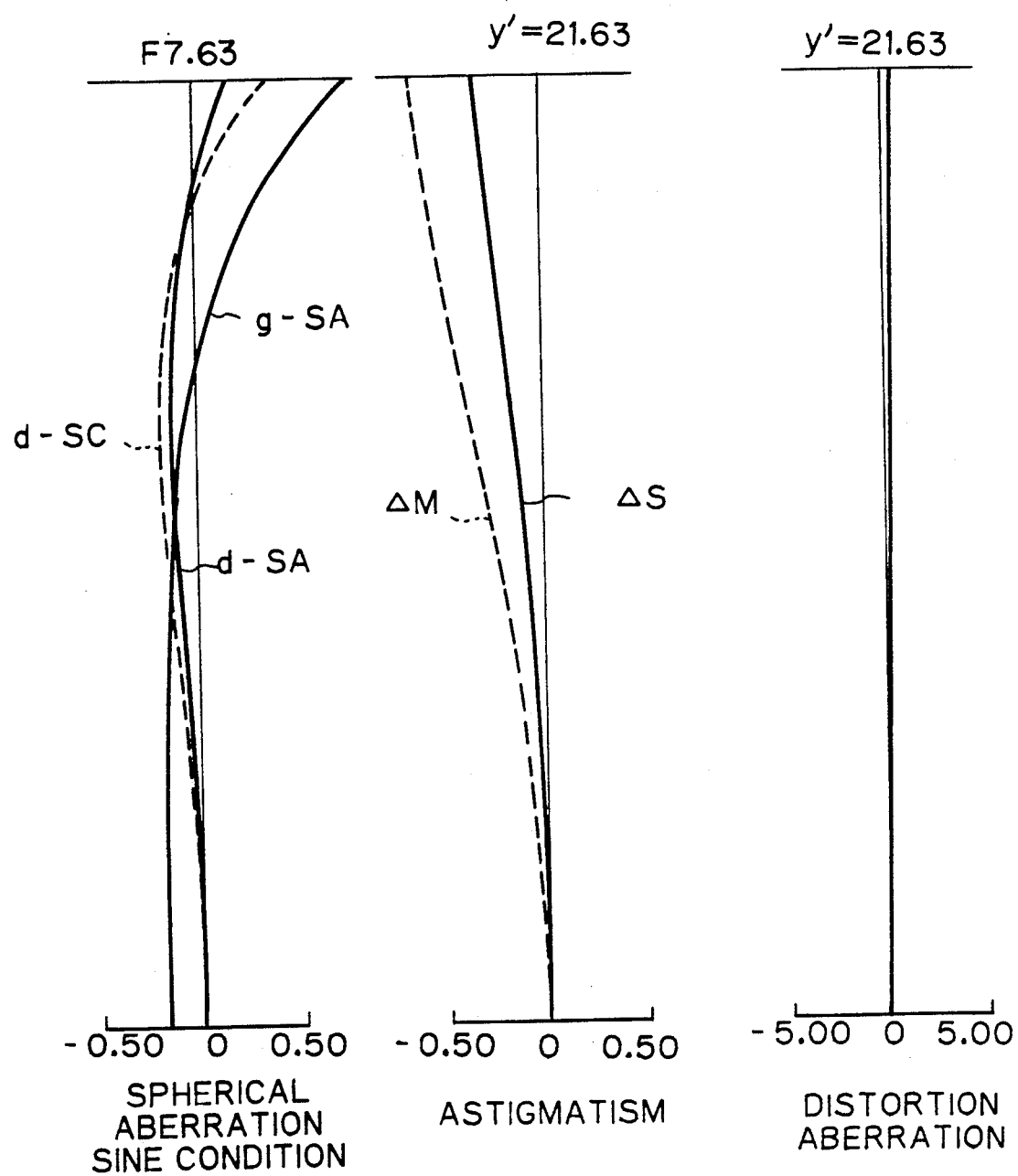

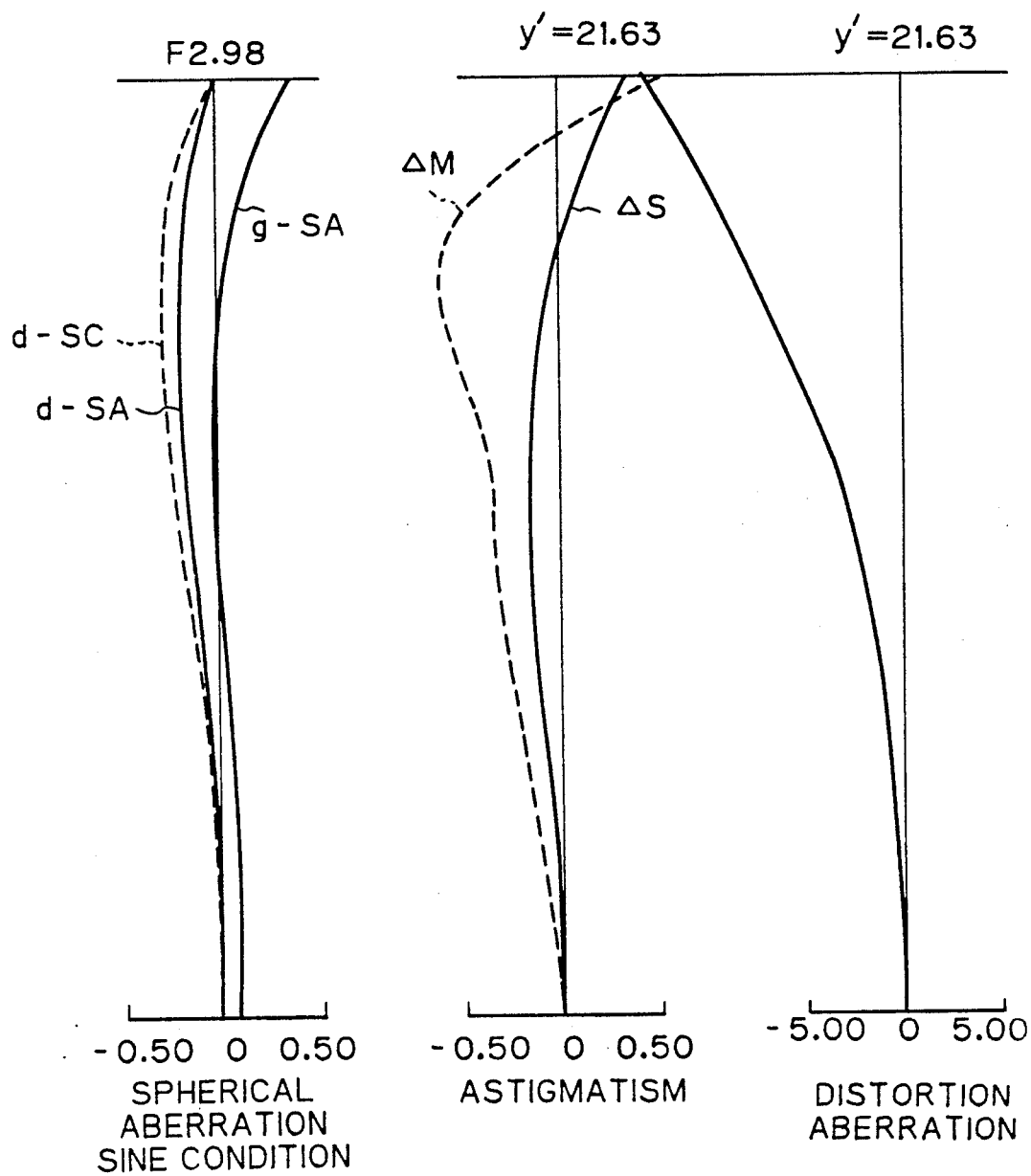

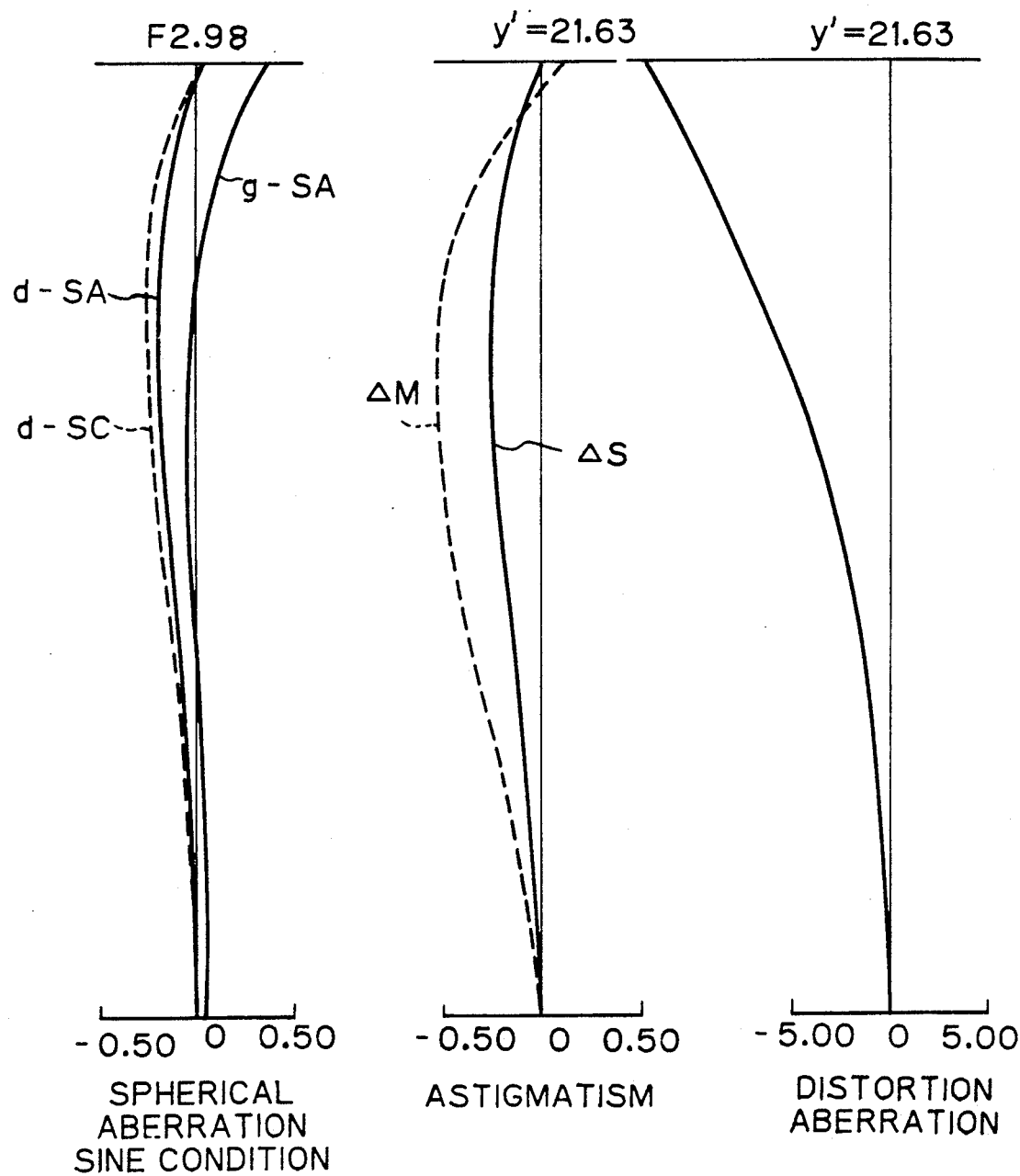

ZOOM LENS AND FOCUSING METHOD

BACKGROUND OF THE INVENTION

1. Field of the Invention

The present invention relates to a zoom lens and a focusing method used for a photographing lens for a 35 mm lens shutter camera for example and a photographic lens for a video camera.

2. Description of the Related Art

Various kinds of zoom lenses are generally known. Japanese Patent Application Laying Open (KOKAI) No. 63-25613 discloses three groups of lenses having negative, positive and negative focal distances as a recent zoom lens. This zoom lens is constructed to perform a zooming operation without any singular point from a wide angle end to a telescopic end.

The inventor of this application also proposed a compact zoom lens constructed by three groups of lenses having negative, positive and negative focal distances as mentioned above in Japanese patent application No. 63-215967.

The zoom lens disclosed in the above laid-open publication has the problems that it is difficult to increase a zoom ratio since the first lens, group is fixed. In the above compact zoom lens, back focus is minimized at the wide angle end and the distances between the respective lens groups are minimized at the telescopic end so that it is difficult to reduce the focal distance at the wide angle end while the focal distance at the telescopic end is held.

SUMMARY OF THE INVENTION

It is therefore a first object of the present invention to provide a compact zoom lens including a half angle of view about 35 degrees as a wide angle and having a zoom ratio about 3.3 times and reduced entire length and diameter from the wide angle side to the telescopic side.

A second object of the present invention is to provide a focusing method having a preferable focusing performance in an entire zoom region of the zoom lens.

The above first object of the present invention can be achieved by a zoom lens comprising first to third lens groups sequentially arranged from an object side toward an image side and respectively having negative, positive and negative focal distances; a first zoom region for performing a zooming operation from a wide angle side to a telescopic side by moving at least the first lens group onto the image side; and a second zoom region for performing the zooming operation from the wide angle side to the telescopic side by moving all the lens groups onto the object side further from the telescopic end of the first zoom region while the distances between the lens groups are changed with respect to each other; the focal distances of the respective lens groups and the focal distance of the entire lens system at the wide angle end satisfying predetermined inequality conditions.

The above second object of the present invention can be achieved by a focusing method in a zoom lens comprising first to third lens groups sequentially arranged from an object side toward an image side and respectively having negative, positive and negative focal distances; a first zoom region for performing a zooming operation from a wide angle side to a telescopic side by moving at least the first lens group onto the image side; and a second zoom region for performing the zooming operation from the wide angle side to the telescopic side by moving all the lens groups onto the object side further from the telescopic end of the first zoom region while the distances between the lens groups are changed with respect to each other; the focal distances of the respective lens groups and the focal distance of the entire lens system at the wide angle end satisfying predetermined inequality conditions; the focusing method comprising the steps of performing a focusing operation by moving the second lens group on an optical axis in the first zoom region; and performing the focusing operation by moving the first lens group on the optical axis in the second zoom region.

Further objects and advantages of the present invention will be apparent from the following description of the preferred embodiments of the present invention as illustrated in the accompanying drawings.

BRIEF DESCRIPTION OF THE DRAWINGS

FIGS. 14 and 15 are views for explaining a comparison example corresponding to Embodiment 1;

FIGS. 16 and 17 are views for explaining a comparison example with respect to Embodiment 2.

DESCRIPTION OF THE PREFERRED EMBODIMENTS

The preferred embodiments of a zoom lens and a focusing method in the present invention will next be described in detail with reference to the accompanying drawings.

Figure 1:
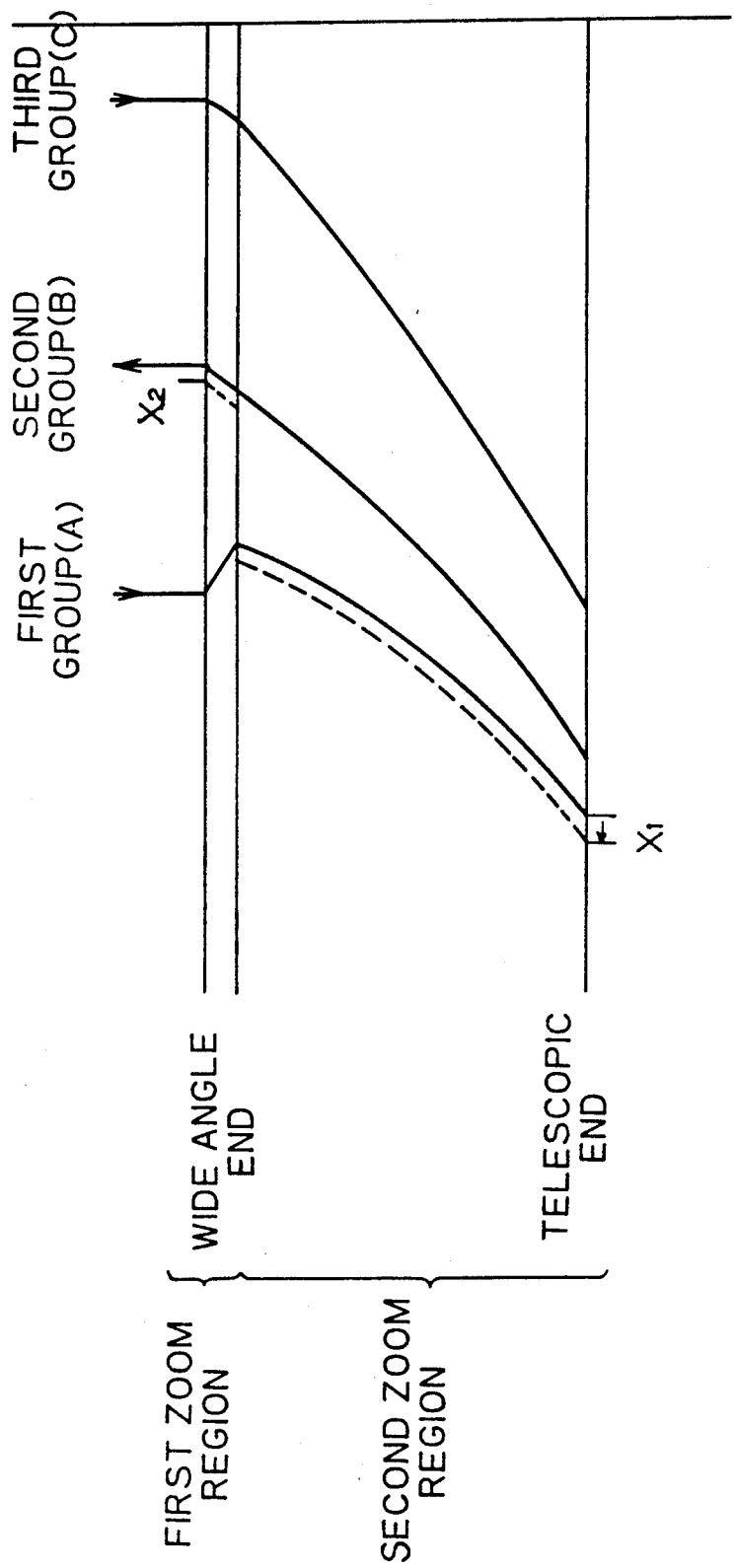
FIG. 1 is a view for explaining a focusing operation and the displacement of respective lens groups caused by a zooming operation in a zoom lens of the present invention.

In a zoom lens in a first embodiment of the present invention, as shown in FIG. 1, first to third lens groups A, B and C are sequentially arranged from an object side (on the left-hand side in FIG. 1) toward an image side (on the right-hand side in FIG. 1).

The first, second and third lens groups A, B and C respectively have negative, positive and negative focal distances.

This zoom lens has two zoom regions composed of first and second zoom regions with respect to a zooming operation.

In the first zoom region, the zooming operation is performed from a wide angle side to a telescopic side by moving at least the first lens group A onto the image side. The second zoom region is continuously connected onto the telescopic side of the first zoom region. In the second zoom region. The zooming operation is performed from the wide angle side to the telescopic side by moving all the lens groups onto the object side while the distances between the lens groups are changed with respect to each other. Solid lines in FIG. 1 designate displacements of the respective lens groups caused by the zooming operation. As can be seen from FIG. 1, the respective lens groups are commonly arranged in a boundary portion between the first and second zoom regions.

When the focal distance of the i-th lens group (i=1, 2, 3) is set to $f_i$ and the focal distance of the entire lens system at the wide angle end in the second zoom region is set to $f_w$, these values satisfy the following three inequality conditions.

$$0.3 < |f_3|/|f_1| < 1 \quad (I)$$

$$1.2 < |f_1|/f_w < 2.3 \quad (II)$$

$$0.9 < |f_3|/f_w < 1.4 \quad (III)$$

A second embodiment of the present invention relates to a focusing method with respect to the zoom lens of the first embodiment and has the following features.

Namely, a focusing operation is performed by moving the second lens group B on an optical axis in the first zoom region. The focusing operation is performed by moving the first lens group A on the optical axis in the second zoom region. In FIG. 1, reference numerals $X_1$ and $X_2$ respectively designate focusing moving amounts of the first and second lens groups A and B.

The above conditions (I) to (III) are the same conditions as those with respect to a compact zoom lens shown in Japanese Patent Application No. 63-215967.

Namely, the condition (I) prescribes the relation in refracting power between the first and third lens groups. When the ratio in the condition (I) exceeds the upper limit thereof, the compactness is lost. In contrast to this, when the ratio in the condition (I) exceeds the lower limit thereof, F/No at a telescopic time increases.

When the ratio in the condition (II) exceeds the upper limit thereof, the F/No at the telescopic time increases and the moving amount of the third lens group caused by the zooming operation is increased so that the distance between the lens groups at the telescopic time is not secured. In contrast to this, when the ratio in the condition (II) exceeds the lower limit thereof, the distance between the second and third lens groups at the wide angle time is increased so that the diameter of the third lens group is increased or a peripheral light amount is reduced.

When the ratio in the condition (III) exceeds the upper limit thereof, a telephotographic nature is reduced and the compactness of the lens system is lost. In contrast to this, when the ratio in the condition (III) exceeds the lower limit thereof, a Petzval sum of the entire lens system is reduced so that it is difficult to provide an image face suitably balanced with respect to the central and peripheral lens portions.

With respect to the zoom lens of this invention, similar to the compact zoom lens shown in Japanese Patent application No. 63-215967, it is desirable to satisfy the following conditions as well as the above conditions (I) to (III) so as to efficiently perform the zooming operation.

Namely, when the distance between main points of the first and second lens groups at the wide angle time is set to $d_{12w}$ and the distance between main points of the second and third lens groups is set to $d_{23w}$, it is desirable for these values to satisfy the following conditions.

$$d_{12w}/f_2 < 1 \quad (IV)$$

$$d_{23w}/f_w < 0.85 \quad (V)$$

The condition (IV) is an effective condition in which the Petzval sum of the entire lens system is suitably held and the lens system at the wide angle time is held to be compact. The condition (V) is an effective condition for preventing the increase in light amount of the third lens group at the wide angle time and the increase in diameter of the third lens group or insufficiency of the peripheral light amount.

In the lens system constructed by the three lens groups, when the focal distance of the first lens group is set to $f_1$ and the magnifications of the second and third lens groups are respectively set to $m_2$ and $m_3$, the focal distance f of the entire lens system is generally provided by the following formula.

$$f = f_1 m_2 m_3 \quad (1)$$

In the following description, the refracting powers of the first and second lens groups are respectively set to $\phi_1(<0)$ and $\phi_2(>0)$ and the combined refracting power of the first and second lens groups is set to $\phi_{1,2}(>0)$. Further, the distance between the principal points of the first and second lens groups is set to $d_{12}$ and the distance from the principal point of the third lens group on the rear side thereof to the image face of the entire lens system is set to bf and the refracting power of the third lens group is set to $\phi_3(<0)$. In this case, the above magnifications $m_2$ and $m_3$ are represented by the following formulas.

$$m_2 = \phi_1/(\phi_1 + \phi_2 - \phi_1 \cdot \phi_2 \cdot d_{12}) \quad (2)$$

$$m_3 = 1 - \phi_3 \cdot bf \quad (3)$$

In the above compact zoom lens proposed by Japanese Patent Application No. 63-215967, when the zooming operation is performed from the wide angle side to the telescopic side, the above $d_{12}$ is reduced to increase the $|m_2|$ and the bf is increased to increase the $|m_3|$. Accordingly, to obtain a large zoom ratio greater than three times, the bf at the wide angle end and the $d_{12}$ at the telescopic end are reduced so that it is difficult to suitably construct the lenses.

When the focal distance is further reduced by this compact zoom lens from the wide angle end, the zoom ratio of the $m_2$ and the $m_3$ is suitably divided and the $d_{12}$ at the telescopic end and the bf at the wide angle end are secured with respect to this compact zoom lens. Accordingly, when the focal distance is further reduced from the wide angle end, the third lens group further approaches an image face from the position thereof at the above wide angle end. Therefore, it is very difficult to suitably construct the lenses when the focal distance is further shortened from the wide angle end.

To solve this problem, the moving amount of the third lens group onto the image face side must be made small when the focal distance is further shortened from the wide angle end.

When the focal distance of the entire lens system at the above wide angle end is set to $f_w$ and the magnifications of the second and third lens groups are respectively set to $m_{2w}$ and $m_{3w}$, the following formula is formed from the formula (1).

$$f_w = f_1 m_{2w} m_{3w} \quad (4)$$

It is assumed that the focal distance is further shortened from this state and the zooming operation is performed until the focal distance of the entire lens system becomes $f'_w$. At this time, when the magnifications of the second and third lens groups are respectively set to $m'_2$ and $m'_3$, the $f'_w$, the $m'_2$ and the $m'_3$ satisfy the following formula.

$$f'_w = f_1 m'_{2w} m'_{3w} \quad (5)$$

In the following description, the distance between the principal points of the second and third lens groups is set to $d_{12w}$ when the focal distance is set to $f_w$. The distance between the main points of the second and third lens groups is set to $d'_{12w}$ when the focal distance is set to $f'_w$. In this case, the ratio of the magnification $m_{2w}$ of the second lens group in the case of the focal distance $f_w$ to the magnification $m'_{2w}$ of the second lens group in the case of the focal distance $f'_w$, i.e., the zoom ration $a_2$ is provided by the following formula from the formula (2).

$$a_2 = (m_{2w}/m'_{2w}) = (\phi_1 + \phi_2 - \phi_1 \cdot \phi_2 \cdot d'_{12w})/(\phi_1 + \phi_2 - \phi_1 \cdot \phi_2 \cdot d_{12w}) \quad (6)$$

In the following description, the distance from the main point of the third lens group on the rear side thereof to the image face of the entire lens system is set to $bf_w$ when the focal distance is set to $f_w$. The distance from the main point of the third lens group on the rear side thereof to the image face of the entire lens system is set to $bf'_w$ when the focal distance is set to $f'_w$. In this case, the ratio of the magnification $m_{3w}$ of the third lens group in the case of the focal distance $f_w$ to the magnification $m'_{3w}$ of the third lens group in the case of the focal distance $f'_w$, i.e., the zoom ratio $a_3$ is provided by the following formula from the formula (3).

$$a_3 = (m_{3w}/m'_{3w}) = (1 - \phi_3 bf_w)/(1 - \phi_3 bf'_w) \quad (7)$$

When $\Delta d_{12w} = d'_{12w} - d_{12w}$, the $a_2$ is provided by the following formula.

$$a_2 = 1 - (\phi_1 \phi_2 \Delta d_{12w}/\phi_{12w}) \quad (8)$$

In the formula (8), the $\phi_{12w}$ designates a combined focal distance of the first and second lens groups with respect to the focal distance $f_w$.

The value $\phi_1 \phi_2/\phi_{12w}$ is negative so that the zoom ratio $a_2$ monotonously increases in accordance with the formula (8) as the $\Delta d_{12w}$ increases.

Further, when $\Delta bf_w = bf'_w - bf_w$, the $a_3$ is provided by the following formula.

$$a_3 = \{(1/\phi_3) - bf_w\}/\{(1/\phi_3) - bf_w - \Delta bf_w\} \quad (9)$$

The value $a_3$ is monotonously reduced and approaches 1 as the value $\Delta bf_w$ approaches zero from a negative value.

The zoom ratio $a$ of the entire lens system is provided as follows.

$$a = (f_w/f'_w) = a_2 a_3 \quad (10)$$

Accordingly, when the focal distance is further shortened from the above wide angle end, the zoom ratio $a$ of the entire lens system is reduced when the moving amount of the third lens group onto the image face side is reduced and the zoom ratio $a_3$ of the third lens group is reduced. To constantly hold the zoom ratio a of the entire lens system, it is preferable to increase the increasing amount of the distance between the principal points of the first and second lens groups and increase the zoom ratio $a_2$ of the second lens group. At this time, the position of the image face is corrected by using the distance between the second and third lens groups. It is possible to constantly set the distance between the second and third lens groups. At this time, the position of the image face is corrected by moving the entire lens system of the first to third lens groups.

It is preferable to increase the increasing amount of the distance between the principal points of the first and second lens groups as much as possible so as to increase the effects of the reduction of the moving amount of the third lens group on the image side when the focal distance is further shortened from the above wide angle end.

In the first embodiment of the present invention, the moving amount of the third lens group on the image side is reduced by increasing the increasing amount of the distance between the main points of the first and second lens groups approximately until the first lens group is moved onto the side of an object. Thus, it is possible to suitably construct the lenses in the first zoom region.

The second embodiment of the present invention will next be described.

As a focusing method with respect to a zoom lens, there are a front focusing system and an inner focusing system. However, one of such systems is normally used through the entire zoom region.

However, in the second embodiment of the present invention, as mentioned above, the focusing systems are different from each other with respect to the first and second zoom regions. Namely, the inner focusing system is used in the first zoom region and the front focusing system is used in the second zoom region.

The first zoom region is located on the wide angle side further from the wide angle end of the second zoom region, and a half angle of view about 35 degrees can be included as the wide angle in this first zoom region. When the half angle of view is thus increased and the front focusing system is used in the first zoom region, a vignetting factor is reduced and a negative distortion aberration is increased when the focusing operation is performed toward a short distance side. However, since the large wide angle as mentioned above is not included in the second zoom region, it is possible to perform a preferable focusing operation by using the front focusing system in the second zoom region.

Namely, by using the front focusing system in the second zoom region, it is possible to keep the advantages of the front focusing system that a drawing-out amount of the first lens group, i.e., the focusing lens group becomes approximately same with respect to the same photographing distance in the second zoom region so that the focusing mechanism is easily simplified. Further, in the zoom lens of the first embodiment, the first lens group has a negative focal distance so that the lens diameter is not increased so much even when the focusing operation is performed toward a short distance side by the front focusing system in the second zoom region.

The focusing operation in the first zoom region will next be described.

In the lens system constructed by three lens groups, the focal distance F of the entire lens system is provided by the above-mentioned formula (1) when the focal distance of the first lens group is set to $f_1$ and the magnifications of the second and third lens groups are respectively set to $m_2$ and $m_3$.

When the focal distance of the third lens group is set to $f_3$ and the distance from the main point of the third lens group on the rear side thereof to the image face of the entire lens system is set to bf, the magnification $m_3$ of the third lens group can be represented as follows by the above-mentioned formula (3).

$$m_3 = 1 - (bf)/f_3 \quad (11)$$

In the zoom lens of the present invention, $f_3 < 0$ and $bf > 0$ are formed so that $m_3 > 1$ is formed by the formula (11).

In the first zoom region, the relation between the focal distance $f_1$ of the first lens group A and the focal distance F of the entire lens system is represented by the following inequality.

$$F < |f_1| \quad (12)$$

Accordingly, the magnification $m_2$ of the second lens group B in the first zoom region is provided by the following formula.

$$|m_2| = |F/(f_1 m_3)| < 1 \quad (13)$$

Accordingly, when the focusing operation is performed by moving the second lens group B on an optical axis in the first zoom region, the second lens group B is moved onto the object side since the formula (13) is formed.

In the second zoom region, the distance between the first lens group A and the second lens group B is reduced on the telescopic side as shown in FIG. 1. In the inner focusing system, it is difficult to secure the moving distance of the second lens group B on the above telescopic side. However, there is no such problem in the first zoom region.

When there is a diaphragm in the second lens group B and the focusing operation is performed by moving the second lens group B onto the object side, a negative distortion aberration amount caused by the first lens group A is reduced and a positive distortion aberration amount caused by the third lens group C is increased. Therefore, there are the first advantages that the negative distortion aberration at the focusing time of infinity is reduced when the focusing operation is performed toward the short distance side. There are also the second advantages that the vignetting factor is increased without increasing the lens diameter since an entrance pupil diameter is moved on the object side.

Three concrete Embodiments 1, 2 and 3 of the present invention will next be described.

In the respective Embodiments, when the zooming operation is performed from the telescopic end to the wide angle end in the first zoom region, the distance between the first and second lens groups is widened and the third lens group is slightly moved onto the image face side of the entire lens system. Further, in the Embodiments, the above conditions (I) to (V) are satisfied.

In the respective Embodiments, reference numeral $r_i$ designates a radius of curvature of an i-th face counted from the object side. Reference numeral $d_i$ designates a distance between the i-th face and an (i+1)-th face counted from the object side. Reference numerals $N_j$ and $v_j$ respectively designate a refractive index of a j-th lens and an Abbe number thereof.

Reference numerals $K_1$, $K_2$ and $K_3$ designate parameters in the conditions (I), (II) and (III). Further, reference numeral f designates a combined focal distance of the entire lens system and reference numeral $\omega$ designates a half angle of view (unit: degree).

When the distance between an aspheric surface (shown by a mark * in the Embodiments) and an optical axis is set to Y and a displacement amount of the aspheric surface in the direction of the optical axis is set to X and aspherical coefficients are set as $A_4$, $A_6$, $A_8$ and $A_{10}$, the aspheric surface is provided by the following known formula.

$$X = [(1/r_i)Y^2/\{1 + \sqrt{1-(Y/r_i)^2}\}] + A_4Y^4 + A_6Y^6 + A_8Y^8 + A_{10}Y^{10}$$

Accordingly, the respective aspherical coefficients are provided with respect to the used aspheric surface.

Figure 2:
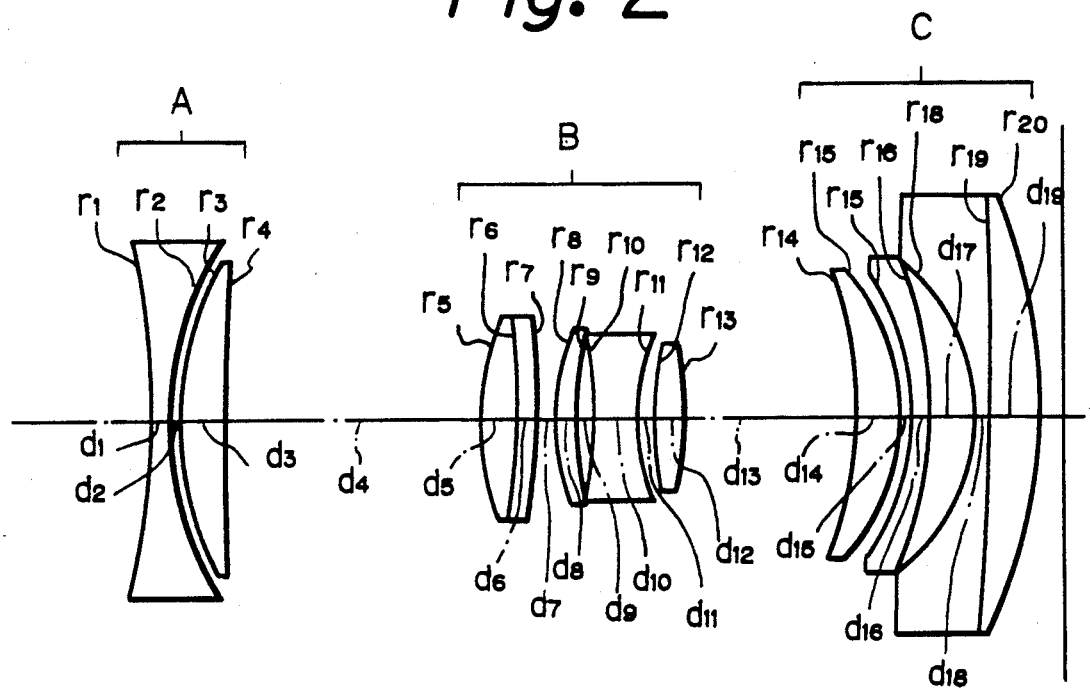
FIGS. 2 and 3 are views showing a lens construction with respect to Embodiment 1.
Figure 6:
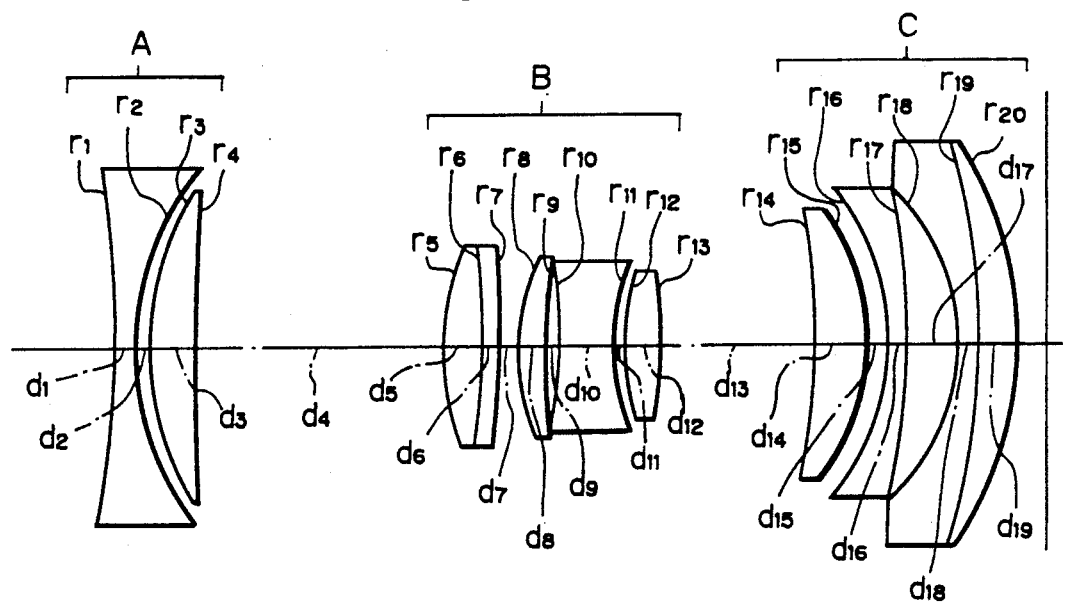
FIGS. 6 and 7 are views showing a lens construction with respect to Embodiment 2.
Figure 10:
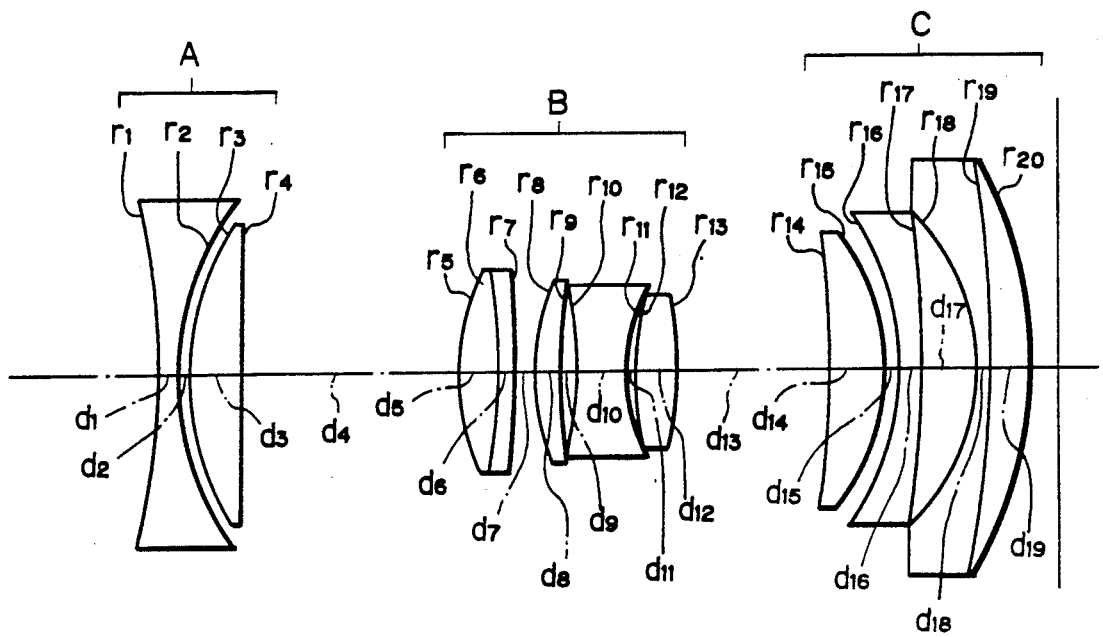
FIGS. 10 and 11 are views showing a lens construction with respect to Embodiment 3.

In FIGS. 2, 6 and 10 showing the lens constructions of the respective embodiments, reference numerals A, B and C respectively designate the first, second and third lens groups.

EMBODIMENT 1

| | $f = 30.9 \sim 102, 1:2.98 \sim 7.66, \omega = 37.3 \sim 11.9$ | | | | |
|---|---|---|---|---|---|
| i | $r_i$ | $d_i$ | j | $N_j$ | $v_j$ |
| 1 | −62.707 | 1.6 | 1 | 1.6968 | 55.5 |
| 2 | 25.15 | 1.0 | | | |
| 3 | 26.914 | 3.4 | 2 | 1.6727 | 32.2 |
| 4 | 190.818 | variable | | | |
| 5 | 21.753 | 3.0 | 3 | 1.6968 | 55.5 |
| 6 | −45.165 | 1.2 | 4 | 1.84666 | 23.8 |
| 7 | −103.608 | 1.7 | | | |
| 8 | 16.48 | 2.2 | 5 | 1.58913 | 61.3 |
| 9 | 70.199 | 0.9 | | | |
| 10 | −58.132 | 3.5 | 6 | 1.834 | 37.3 |
| 11 | 14.91 | 1.6 | | | |
| 12 | 37.767 | 2.5 | 7 | 1.58913 | 61.3 |
| 13 | −24.651 | variable | | | |
| 14 | −35.226 | 4.0 | 8 | 1.5927 | 35.5 |
| 15 | −15.474 | 0.8 | | | |
| 16 | −18.709 | 1.6 | 9 | 1.7725 | 49.6 |
| 17 | −28.541 | 3.8 | | | |
| 18* | −14.119 | 1.4 | 10 | 1.7725 | 49.6 |
| 19 | −265.794 | 4.0 | 11 | 1.72825 | 28.3 |
| 20 | −41.557 | | | | |

Variable Amounts

| distance of object | first zoom region | | second zoom region | |
|---|---|---|---|---|
| ∞ | f | 30.944 | 36.001 | 60.597 | 102.002 |
| | $d_4$ | 21.107 | 15.022 | 8.347 | 1.322 |
| | $d_{13}$ | 13.752 | 13.561 | 5.327 | 1.418 |

Aspheric Surface (18-th Face)

$A_4 = 8.34986 \cdot 10^{-6}$, $A_6 = 1.38658 \cdot 10^{-7}$
$A_8 = -1.50623 \cdot 10^{-9}$, $A_{10} = 1.015821 \cdot 10^{-11}$ Conditional Values $K_1 = 0.647$, $K_2 = 1.667$, $K_3 = 1.078$.

FIG. 2 shows the lens construction at the wide angle end in the second zoom region with respect to this Embodiment.

In this Embodiment 1, when the focusing operation is performed such that the distance of the object is set to 1 m by the method of the second embodiment, the values of the above variable amounts are provided as follows.

| distance of object | first zoom region | | second zoom region | |
|---|---|---|---|---|
| ∞ | f | 30.944 | 36.001 | 60.597 | 102.002 |
| 1m | $d_4$ | 20.198 | 18.678 | 12.034 | 5.089 |
|  | $d_{13}$ | 14.661 | 13.561 | 5.327 | 1.418 |

Figure 3:
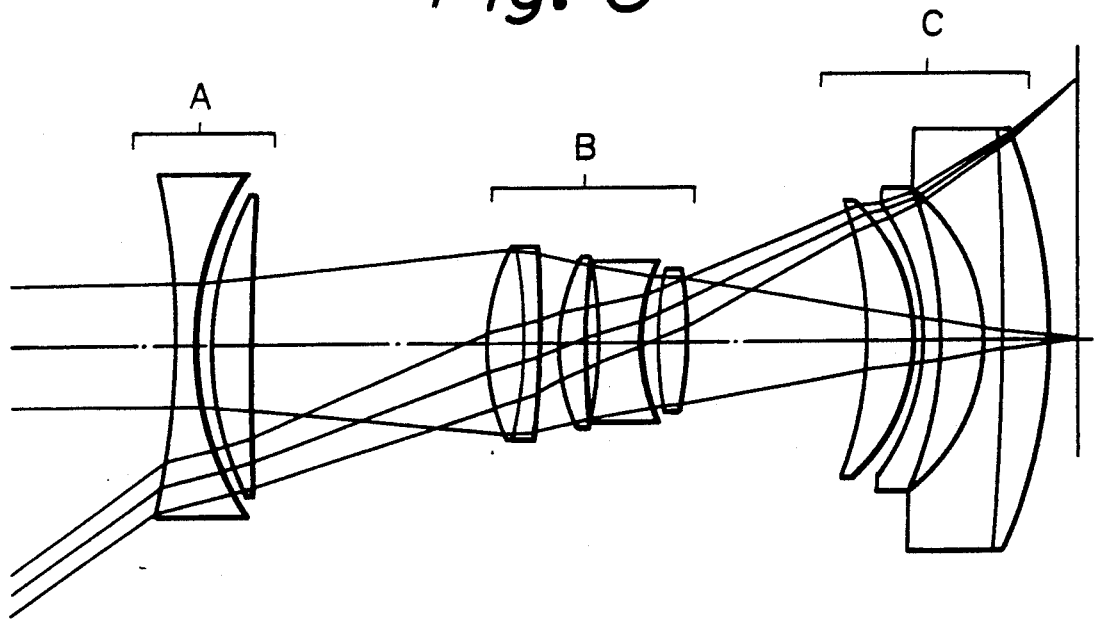

FIG. 3 shows the lens construction and the light beam on the optical axis and the peripheral light beam closest thereto in the focusing state in which the distance of the object is set to 1 m at the wide angle end of the first zoom region.

Figure 4A:
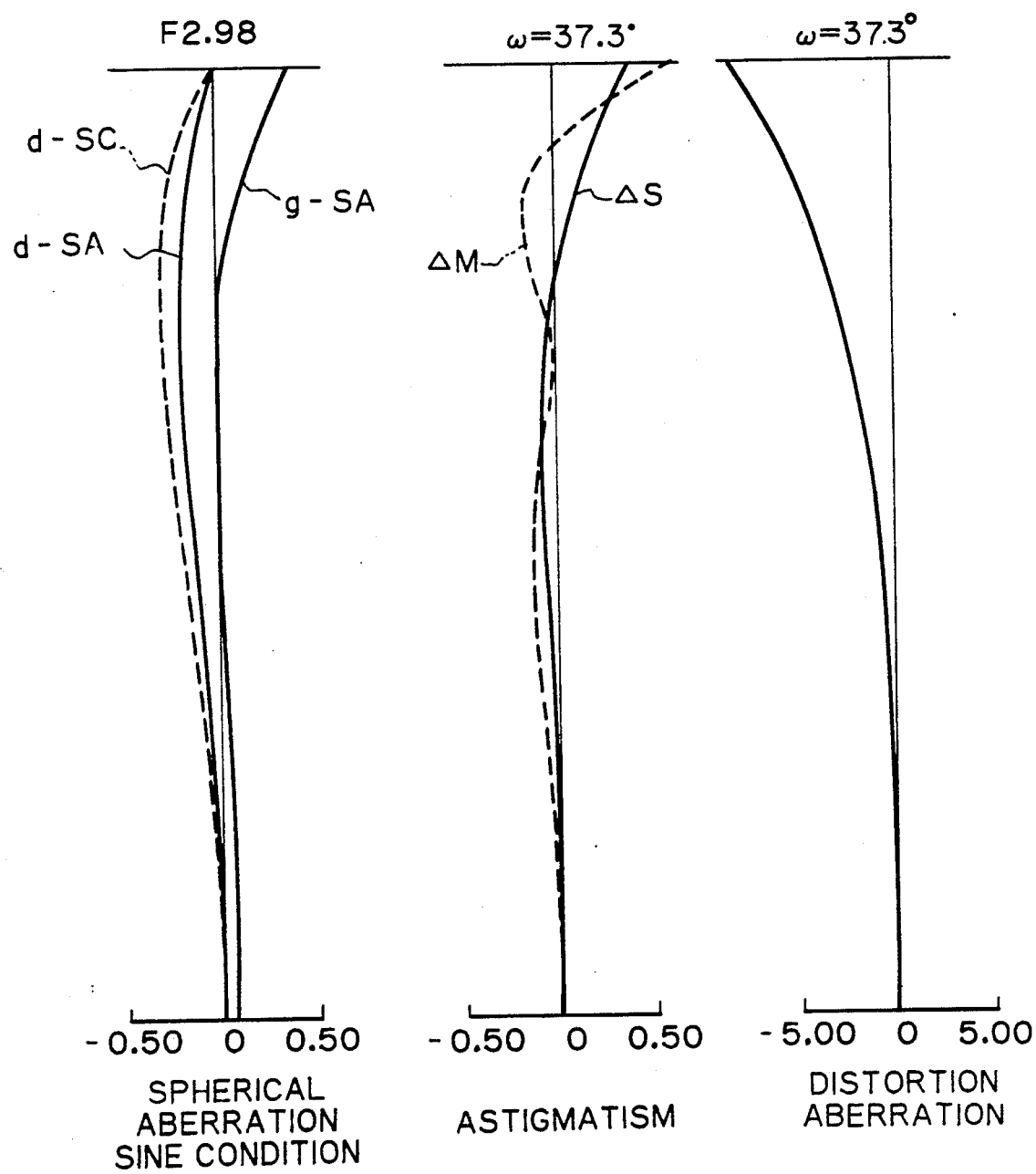
FIGS. 4 and 5 are aberration diagrams with respect to Embodiment 1.
Figure 4B:
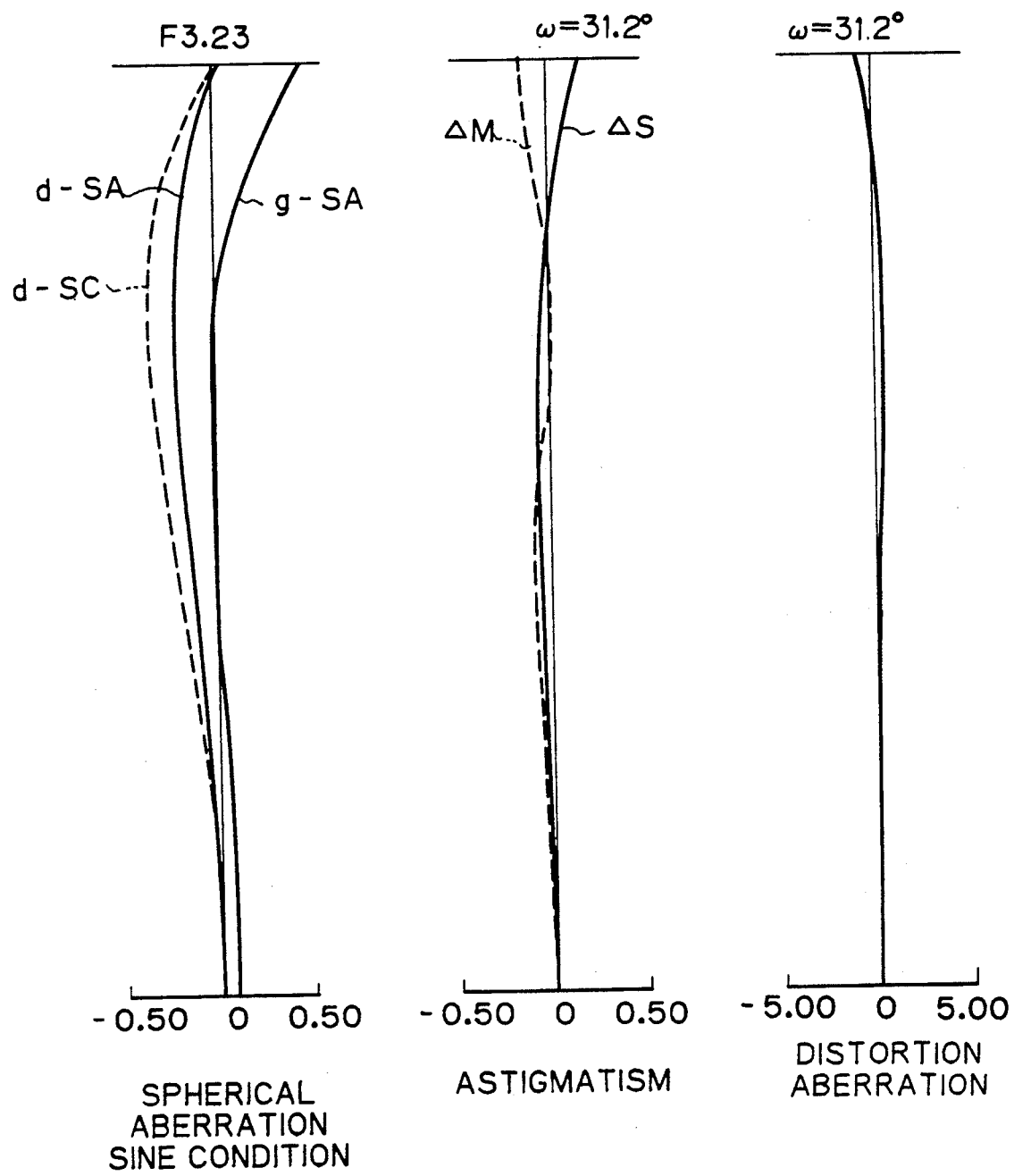
Figure 5B:
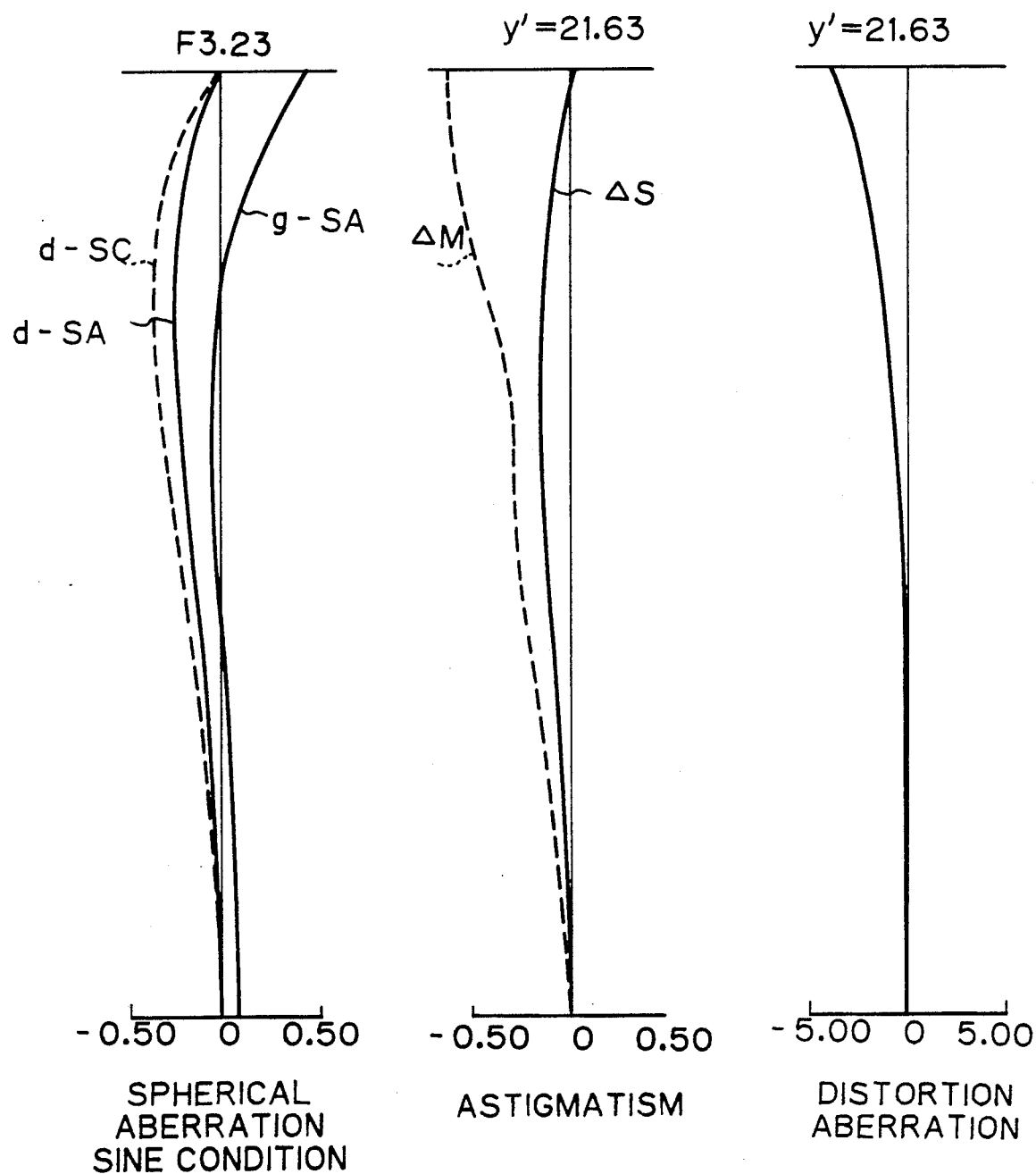
Figure 5C:
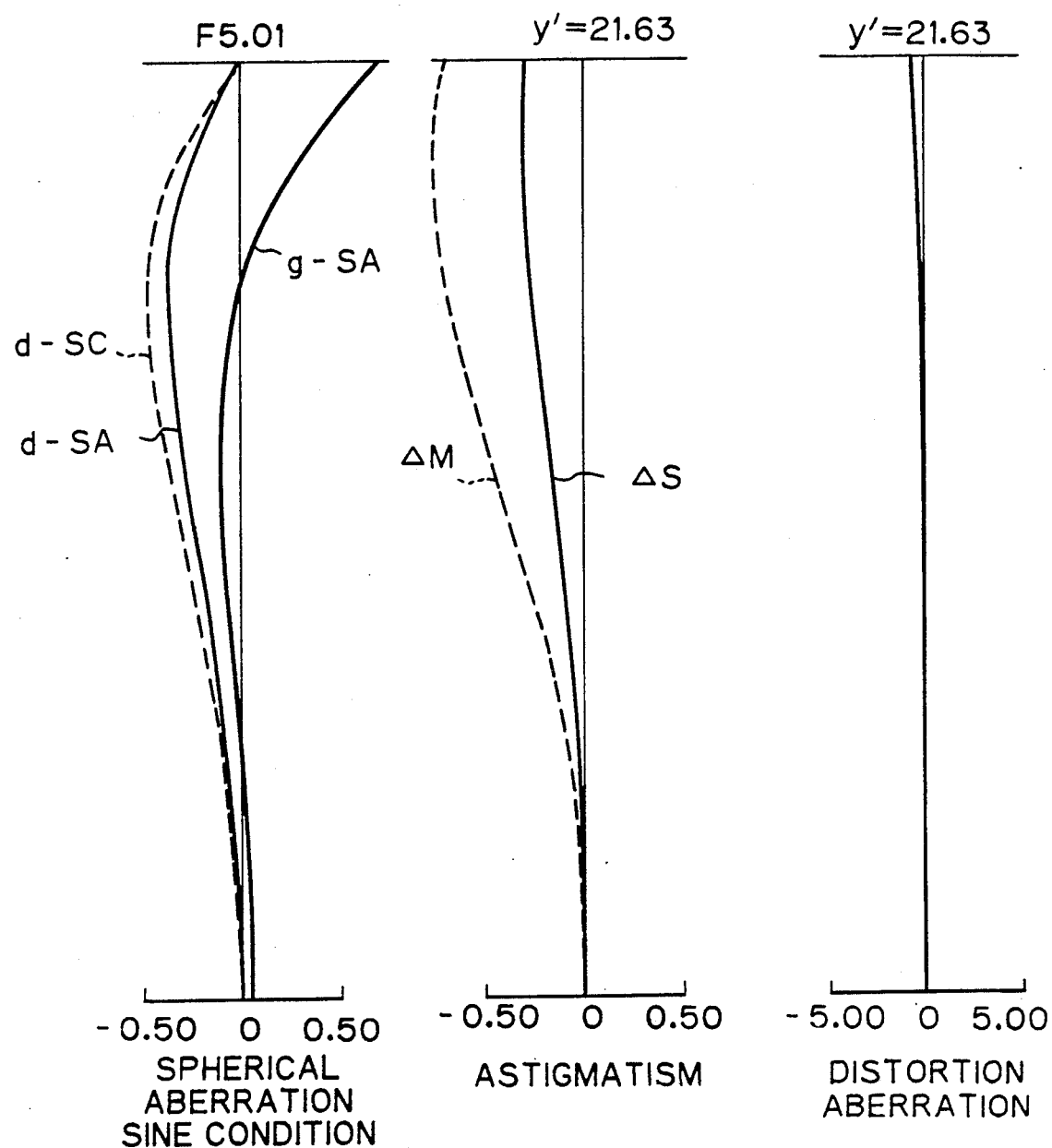
Figure 5D:
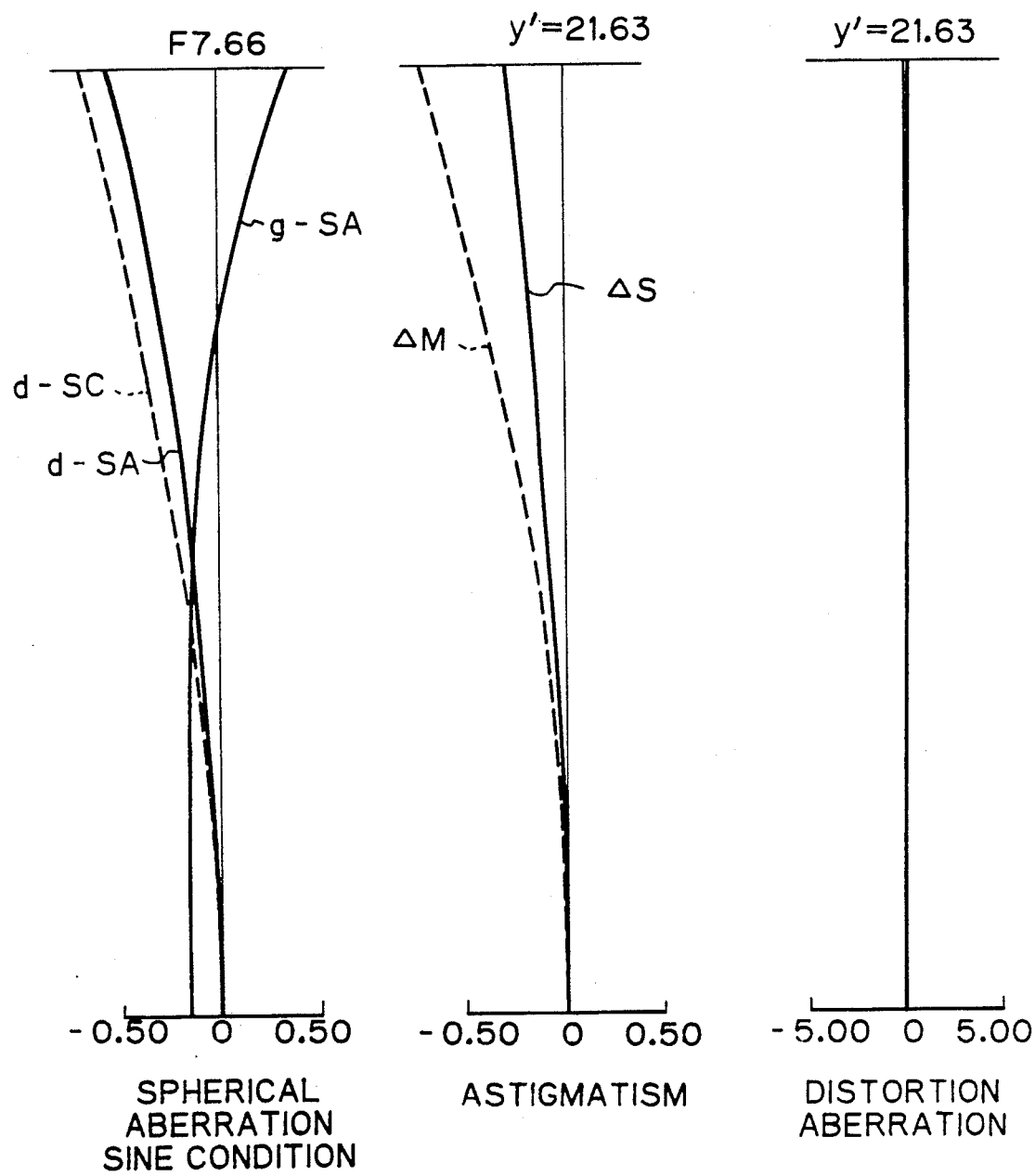

FIGS. 4 and 5 are aberration diagrams with respect to the Embodiment 1. FIG. 4a is an aberration diagram at the focusing time of the infinity at the wide angle end of the first zoom region. FIG. 4b is an aberration diagram at the focusing time of the infinity at the wide angle end of the second zoom region. FIGS. 4c and 4d are respectively aberration diagrams at the focusing time of the infinity in an intermediate portion of the second zoom region and at the telescopic end thereof. FIGS. 5a to 5d are respectively aberration diagrams in the focusing state in which the distance of the object is set to 1 m in the aberration states of FIGS. 4a to 4d.

In the figures showing astigmatisms, ΔS and ΔM respectively designate a sagittal image surface and a meridional image surface. Further, in the figures showing spherical aberrations, sine conditions and distortion aberrations, reference numerals d and g respectively designate d and g lines. Reference numeral Y' designates a height of the image.

EMBODIMENT 2

| | f = 30.9~102,1:2.98~7.63, ω= 37.2~11.9 | | | | |
|---|---|---|---|---|---|
| i | $r_i$ | $d_i$ | j | $N_j$ | $V_j$ |
| 1 | −62.707 | 1.6 | 1 | 1.6968 | 55.5 |
| 2 | 23.134 | 1.2 | | | |
| 3 | 24.394 | 3.4 | 2 | 1.64769 | 33.8 |
| 4 | 183.184 | variable | | | |
| 5 | 24.14 | 3.0 | 3 | 1.713 | 53.9 |
| 6 | −50.0 | 1.2 | 4 | 1.84666 | 23.8 |
| 7 | −132.466 | 1.7 | | | |
| 8 | 17.138 | 2.2 | 5 | 1.58913 | 61.3 |
| 9 | 66.643 | 0.9 | | | |
| 10 | −62.259 | 4.5 | 6 | 1.834 | 37.3 |
| 11 | 15.206 | 1.1 | | | |
| 12 | 25.6 | 3.0 | 7 | 1.58913 | 61.3 |
| 13 | −25.67 | variable | | | |
| 14 | −55.581 | 4.0 | 8 | 1.62004 | 36.3 |
| 15 | −17.752 | 1.5 | | | |
| 16 | −18.748 | 1.6 | 9 | 1.713 | 53.9 |
| 17 | −87.503 | 4.6 | | | |
| 18 | −15.624 | 1.4 | 10 | 1.7725 | 49.6 |
| 19 | −62.392 | 3.0 | 11 | 1.72825 | 28.3 |
| 20 | −30.602 | | | | |

Variable Amounts

| distance of object | first zoom region | | second zoom region | |
|---|---|---|---|---|
| ∞ | f | 30.943 | 36.001 | 60.596 | 101.998 |
|  | $d_4$ | 20.079 | 13.51 | 7.089 | 0.51 |
|  | $d_{13}$ | 12.344 | 12.719 | 5.044 | 1.349 |

Conditional Values $K_1 = 0.639$, $K_2 = 1.611$, $K_3 = 1.03$.

FIG. 6 shows the lens construction at the wide angle end of the second zoom region with respect to this Embodiment.

In the Embodiment 2, when the focusing operation is performed such that the distance of the object is set to 1 m by the method of the second embodiment, the values of the above variable amounts are provided as follows.

| distance of object | first zoom region | | second zoom region | |
|---|---|---|---|---|
| ∞ | f | 30.943 | 36.001 | 60.596 | 101.998 |
| 1m | $d_4$ | 19.212 | 16.931 | 10.54 | 4.036 |
|  | $d_{13}$ | 13.211 | 12.719 | 5.044 | 1.349 |

Figure 7:
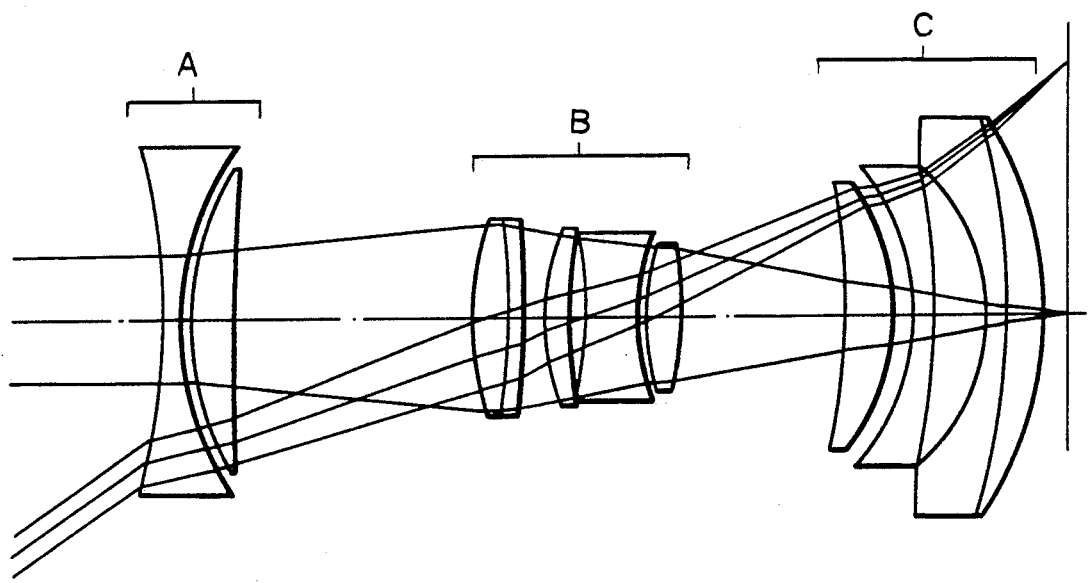

FIG. 7 shows the lens construction and the light beam on the optical axis and the peripheral light beam closest thereto in the focusing state in which the distance of the object is set to 1 m at the wide angle end of the first zoom region.

Figure 8C:
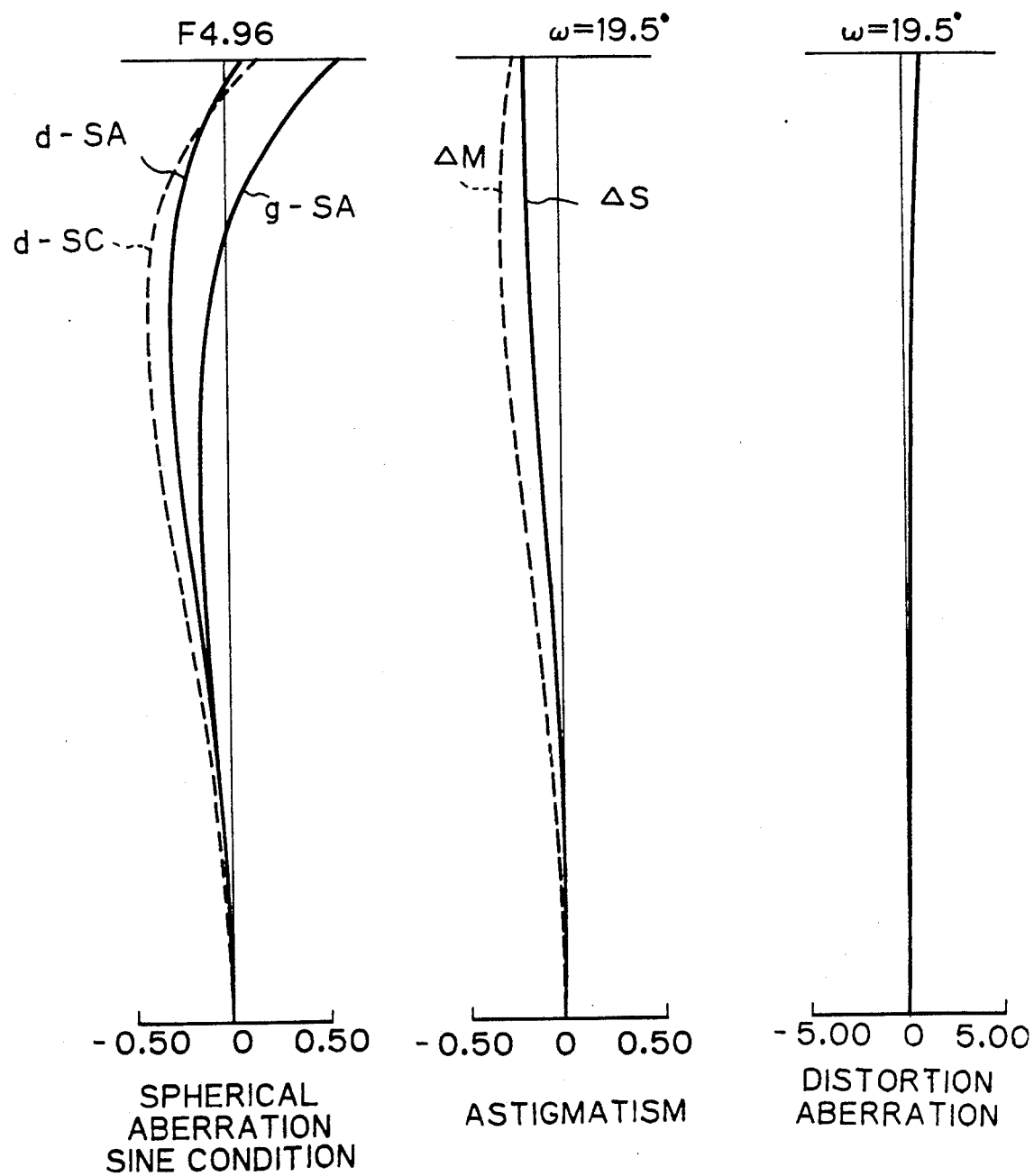
FIGS. 8 and 9 are aberration diagrams with respect to Embodiment 2.
Figure 9B:
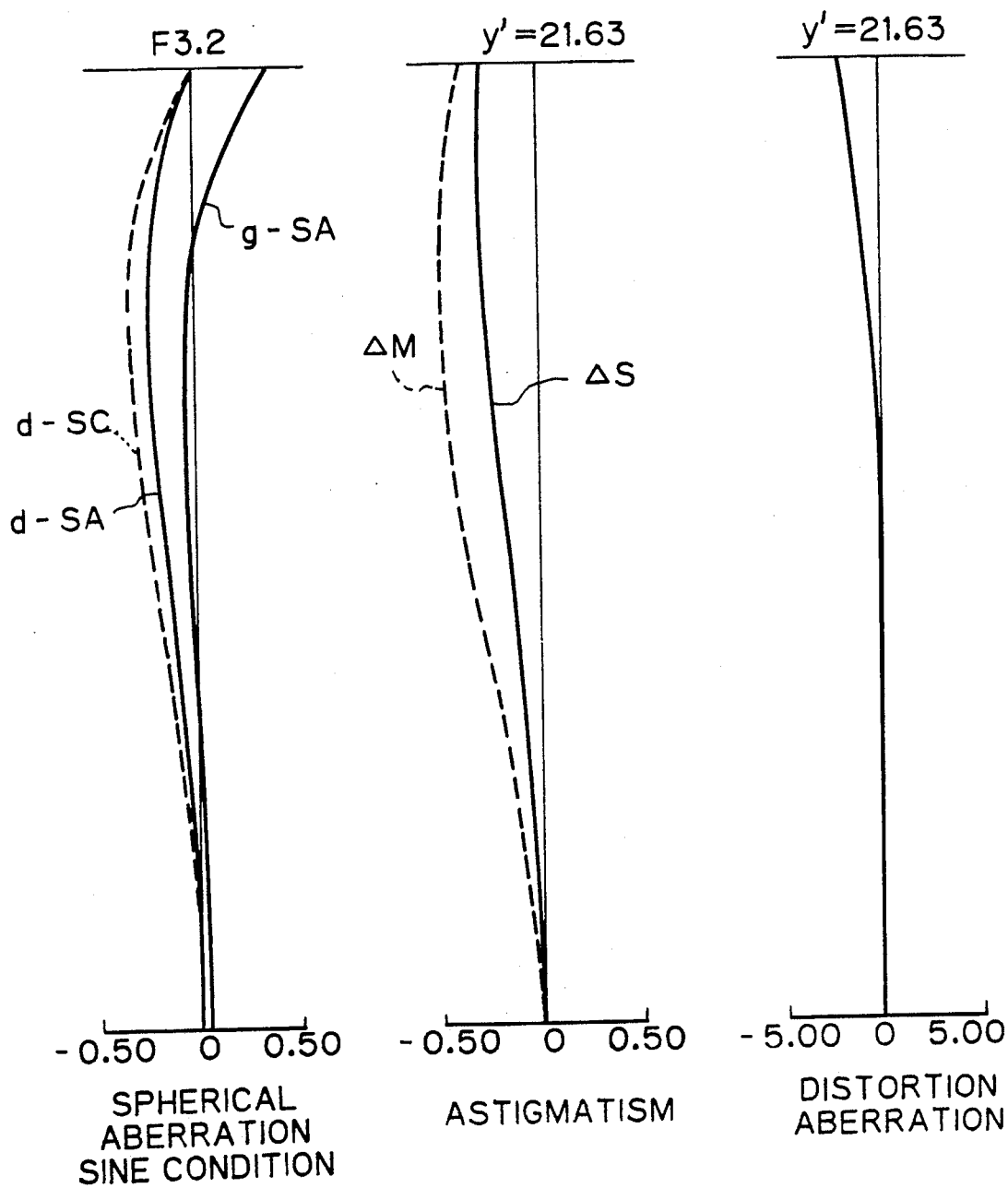
Figure 9C:
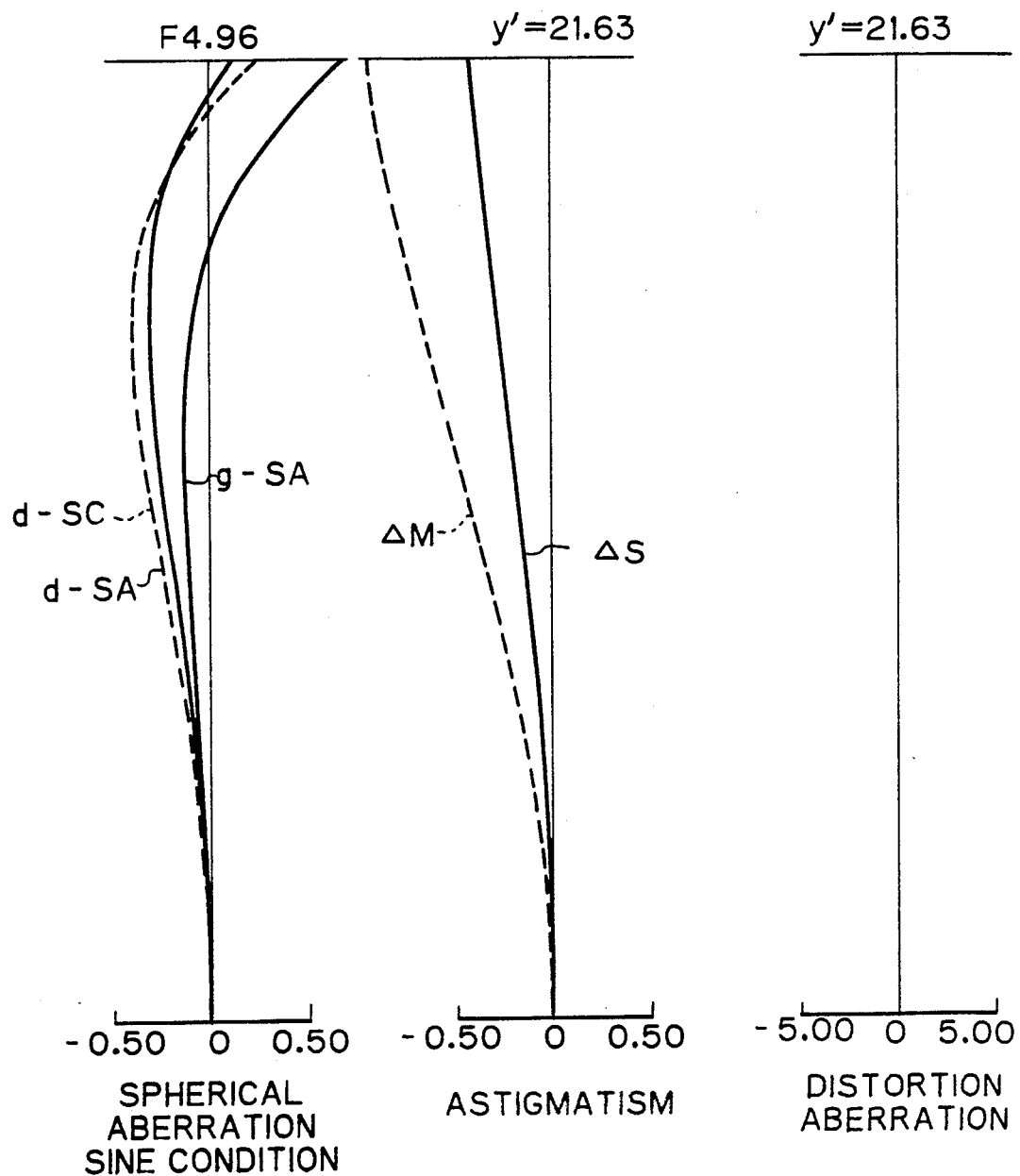

FIGS. 8 and 9 are aberration diagrams with respect to the Embodiment 2. FIG. 8a is an aberration diagram at the focusing time of the infinity at the wide angle end of the first zoom region. FIG. 8b is an aberration diagram at the focusing time of the infinity at the wide angle end of the second zoom region. FIGS. 8c and 8d are respectively aberration diagrams at the focusing time of the infinity in an intermediate portion of the second zoom region and at the telescopic end thereof. FIGS. 9a to 9d are respectively aberration diagrams in the focusing state in which the distance of the object is set to 1 m in the aberration states of FIGS. 8a to 8d.

EMBODIMENT 3

| | f = 30.9~102,1:2.97~7.73, ω= 37~11.9 | | | | |
|---|---|---|---|---|---|
| i | $r_i$ | $d_i$ | j | $N_j$ | $V_j$ |
| 1 | −63.0 | 1.6 | 1 | 1.6968 | 55.5 |
| 2 | 21.715 | 1.3 | | | |
| 3 | 23.58 | 3.4 | 2 | 1.64769 | 33.8 |
| 4 | 192.9 | variable | | | |
| 5 | 23.584 | 3.0 | 3 | 1.6968 | 55.5 |
| 6 | −46.0 | 1.2 | 4 | 1.84666 | 23.8 |
| 7 | −107.601 | 1.7 | | | |
| 8 | 17.151 | 2.2 | 5 | 1.58913 | 61.3 |
| 9 | 91.075 | 0.9 | | | |
| 10 | −58.315 | 4.2 | 6 | 1.834 | 37.3 |
| 11 | 15.287 | 0.9 | | | |
| 12 | 30.694 | 3.2 | 7 | 1.58913 | 61.3 |
| 13 | −24.511 | variable | | | |
| 14 | −52.789 | 4.0 | 8 | 1.5927 | 35.5 |
| 15* | −17.689 | 1.5 | | | |
| 16 | −19.616 | 1.6 | 9 | 1.713 | 53.9 |
| 17 | −78.448 | 4.6 | | | |
| 18 | −16.143 | 1.4 | 10 | 1.7725 | 49.6 |
| 19 | −80.432 | 3.0 | 11 | 1.72825 | 28.3 |
| 20 | −33.488 | | | | |

Variable Amounts

| distance of object | first zoom region | | second zoom region | |
|---|---|---|---|---|
| ∞ | f  30.943 | 36.0 | 60.596 | 101.998 |
|   | $d_4$  18.437 | 13.228 | 7.711 | 0.728 |
|   | $d_{13}$  12.662 | 12.265 | 4.184 | 1.076 |

Aspheric Surface (15-th Face)

$A_6 = -3.56724 \cdot 10^{-9}$, $A_8 = -2.80937 \cdot 10^{-10}$.

Conditional Values $K_1 = 0.662$, $K_2 = 1.556$, $K_3 = 1.029$.

FIG. 10 shows the lens construction at the wide angle end in the second zoom region with respect to this Embodiment.

In this Embodiment 3, when the focusing operation is performed such that the distance of the object is set to 1 m by the mehtod of the second embodiment, the values of the above variable amounts are provided as follows.

| distance of object | first zoom region | | second zoom region | |
|---|---|---|---|---|
| ∞ | f  30.943 | 36.0 | 60.596 | 101.998 |
| 1m | $d_4$  17.517 | 16.421 | 10.938 | 4.023 |
|   | $d_{13}$  13.582 | 12.265 | 4.184 | 1.076 |

Figure 11:
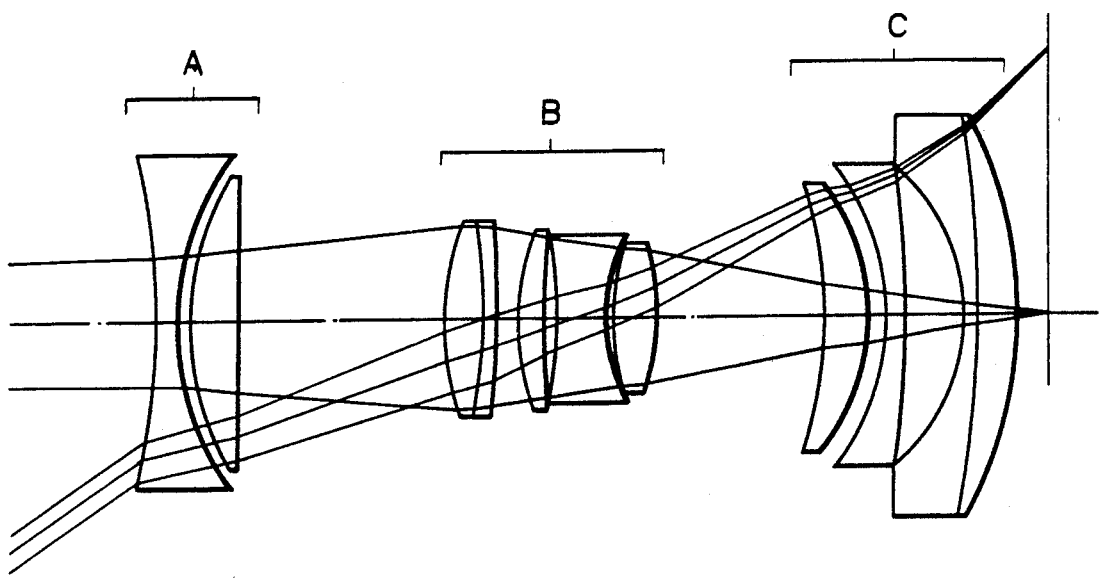

FIG. 11 shows the lens construction and the light beam on the optical axis and the peripheral light beam closest thereto in the focusing state in which the distance of the object is set to 1 m at the wide angle end of the first zoom region.

Figure 12:
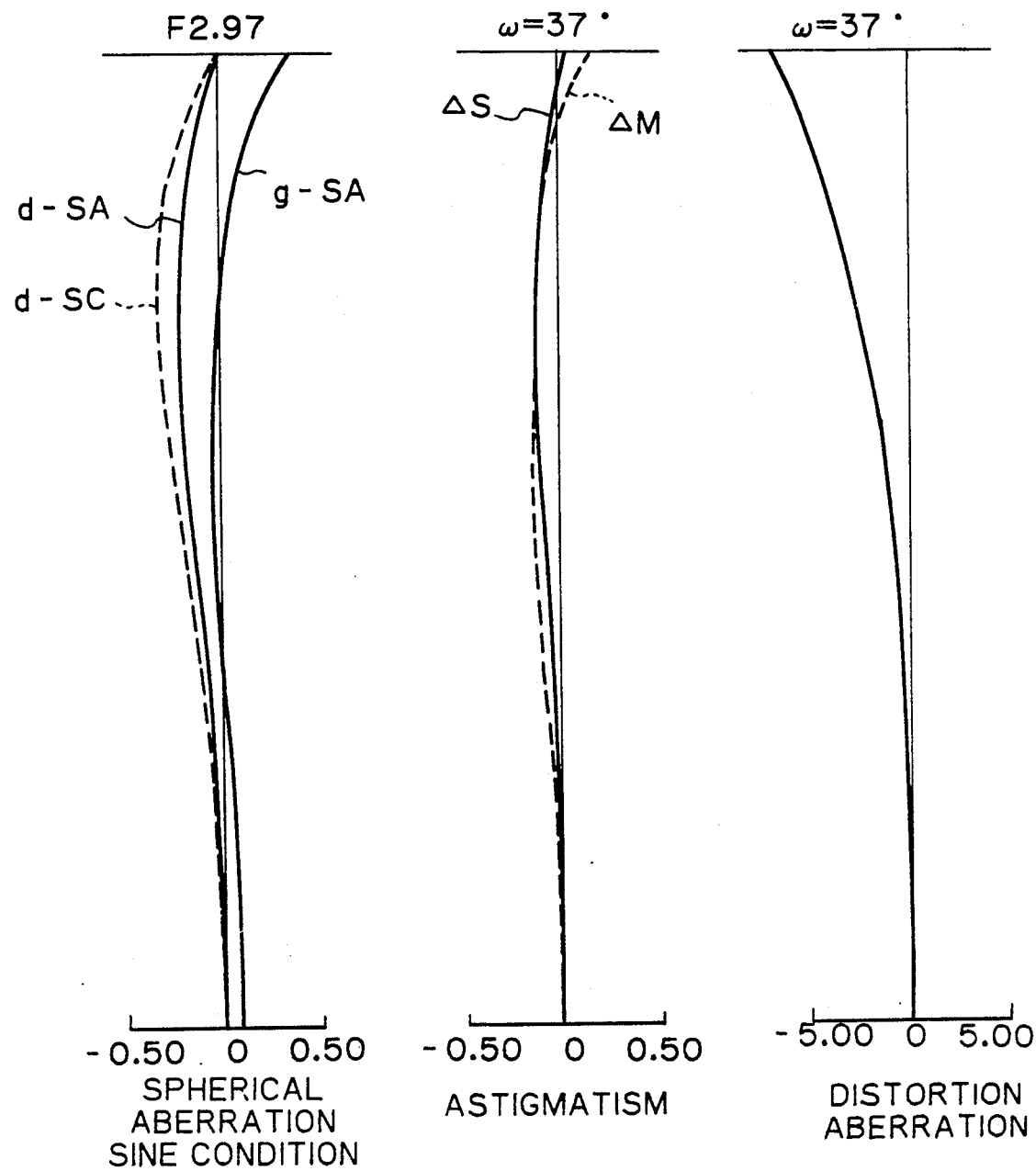
FIGS. 12 and 13 are aberration diagrams with respect to Embodiment 3.
Figure 12:
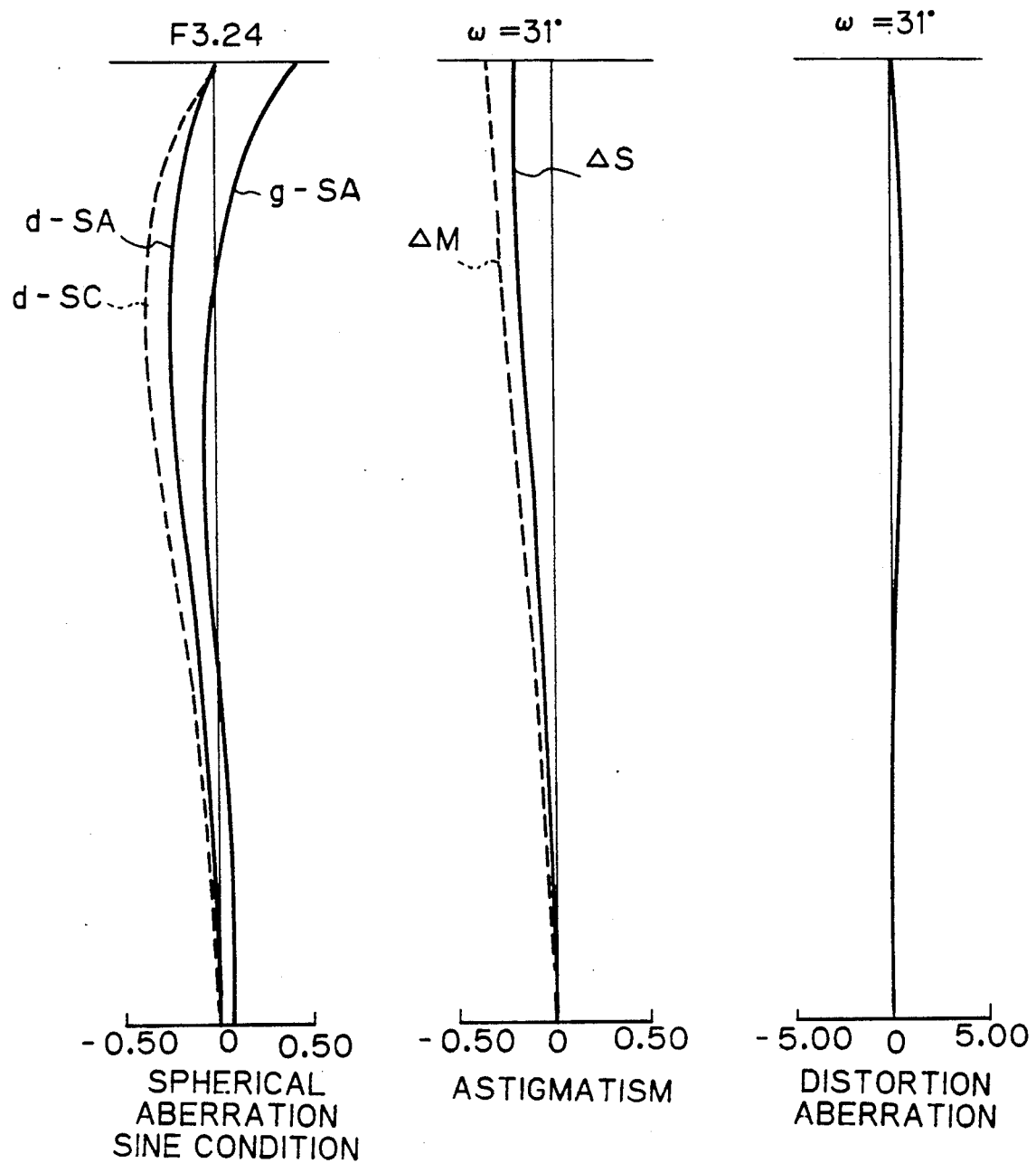
Figure 12:
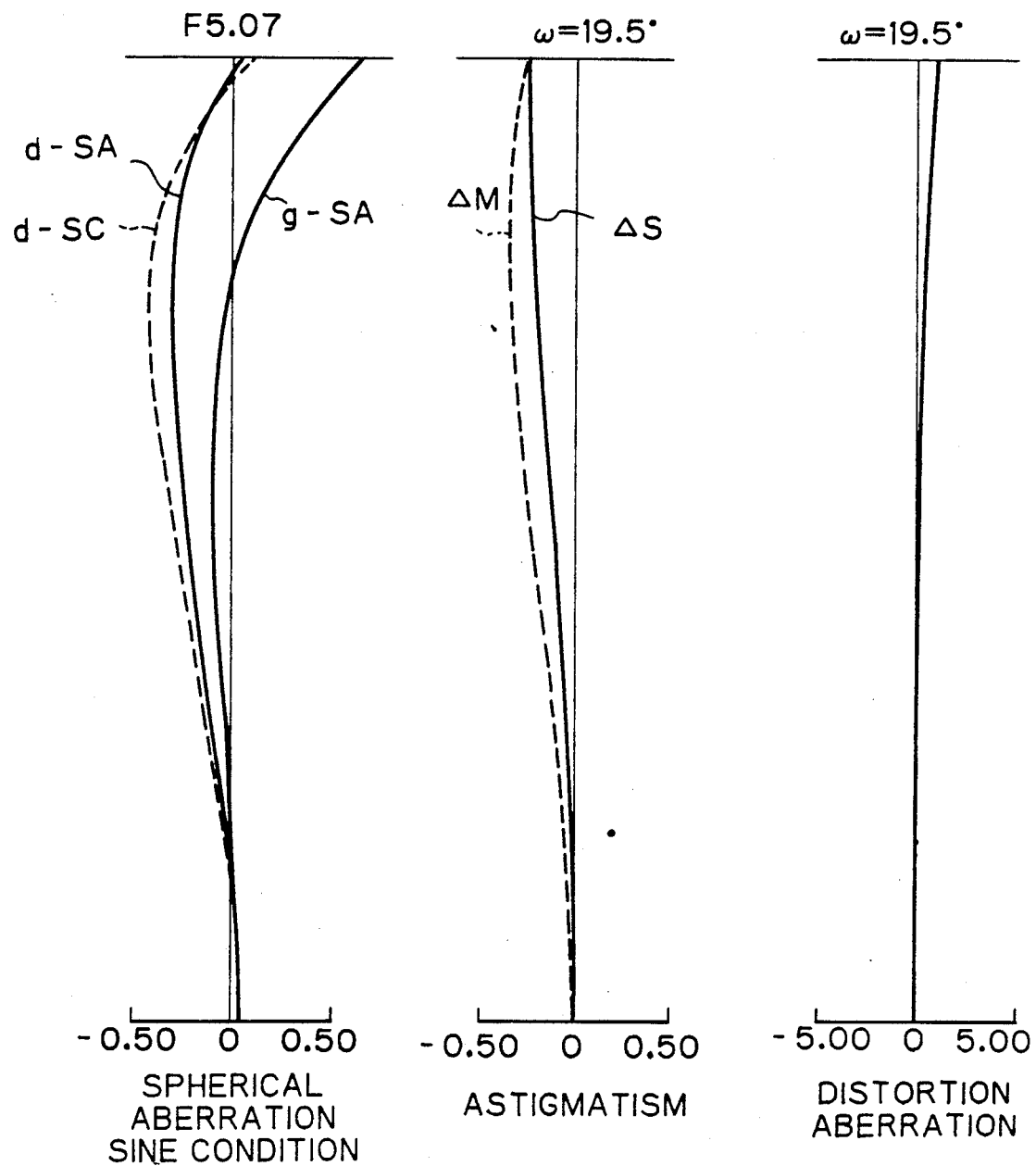
Figure 12:
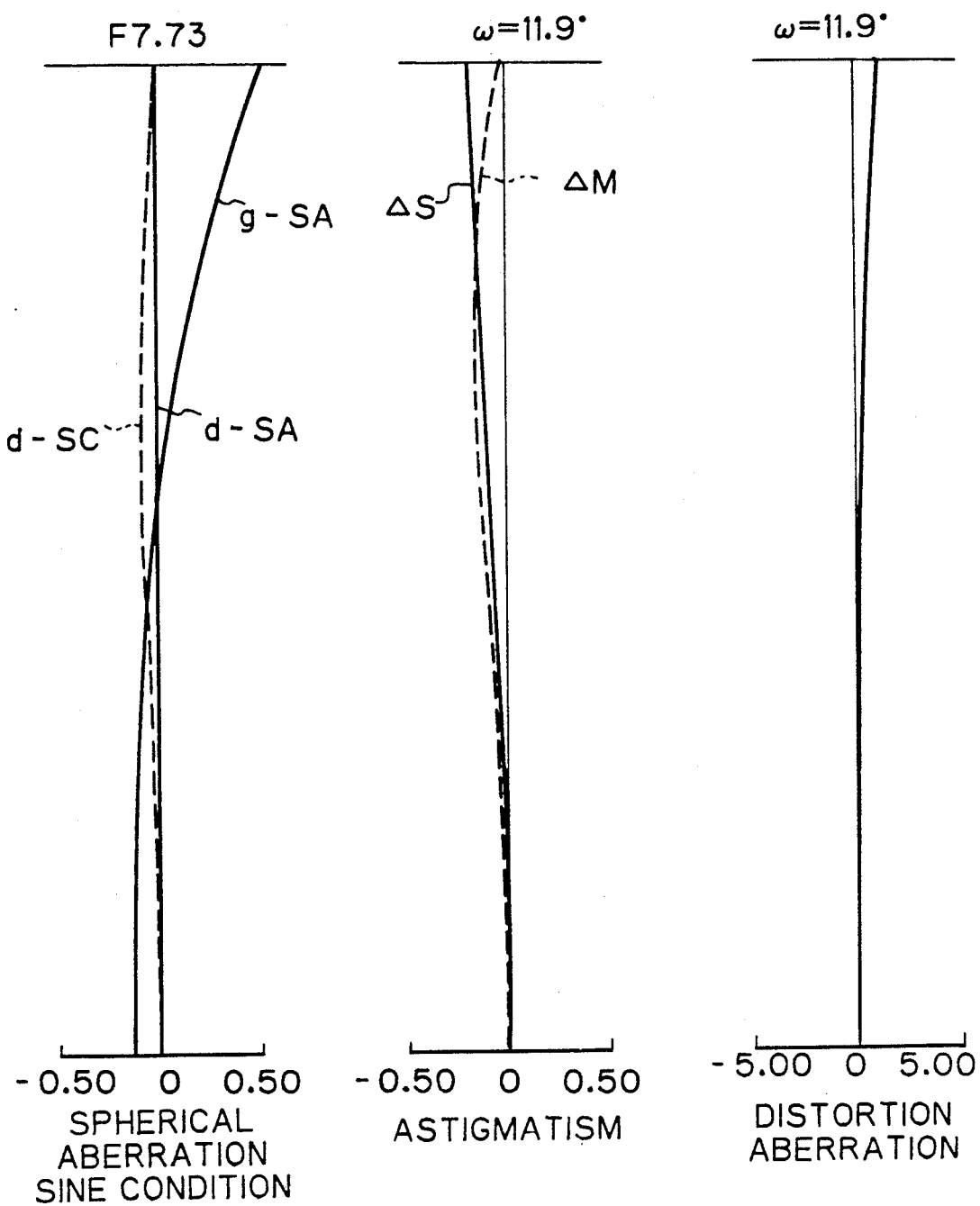
Figure 13:
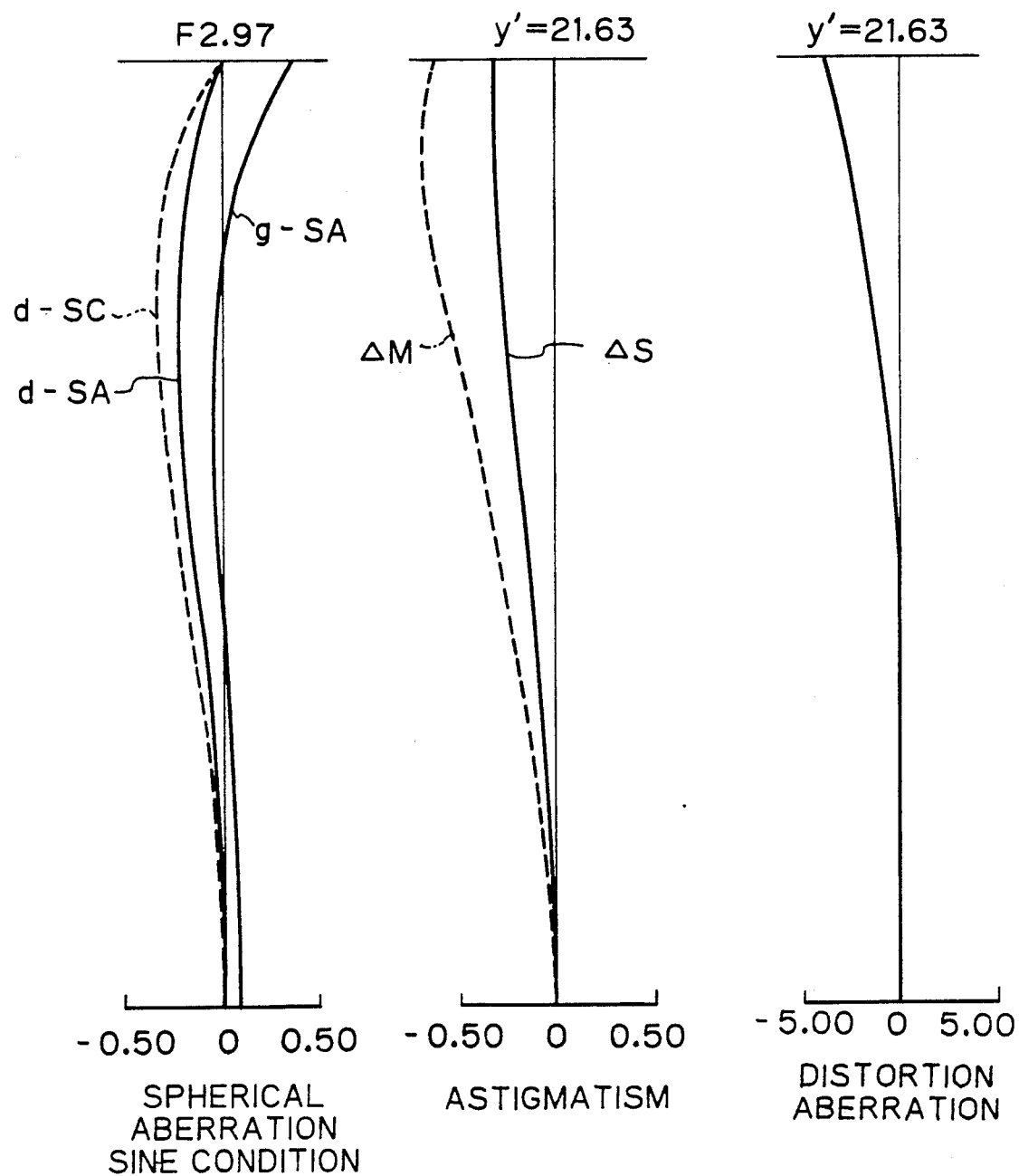
Figure 13:
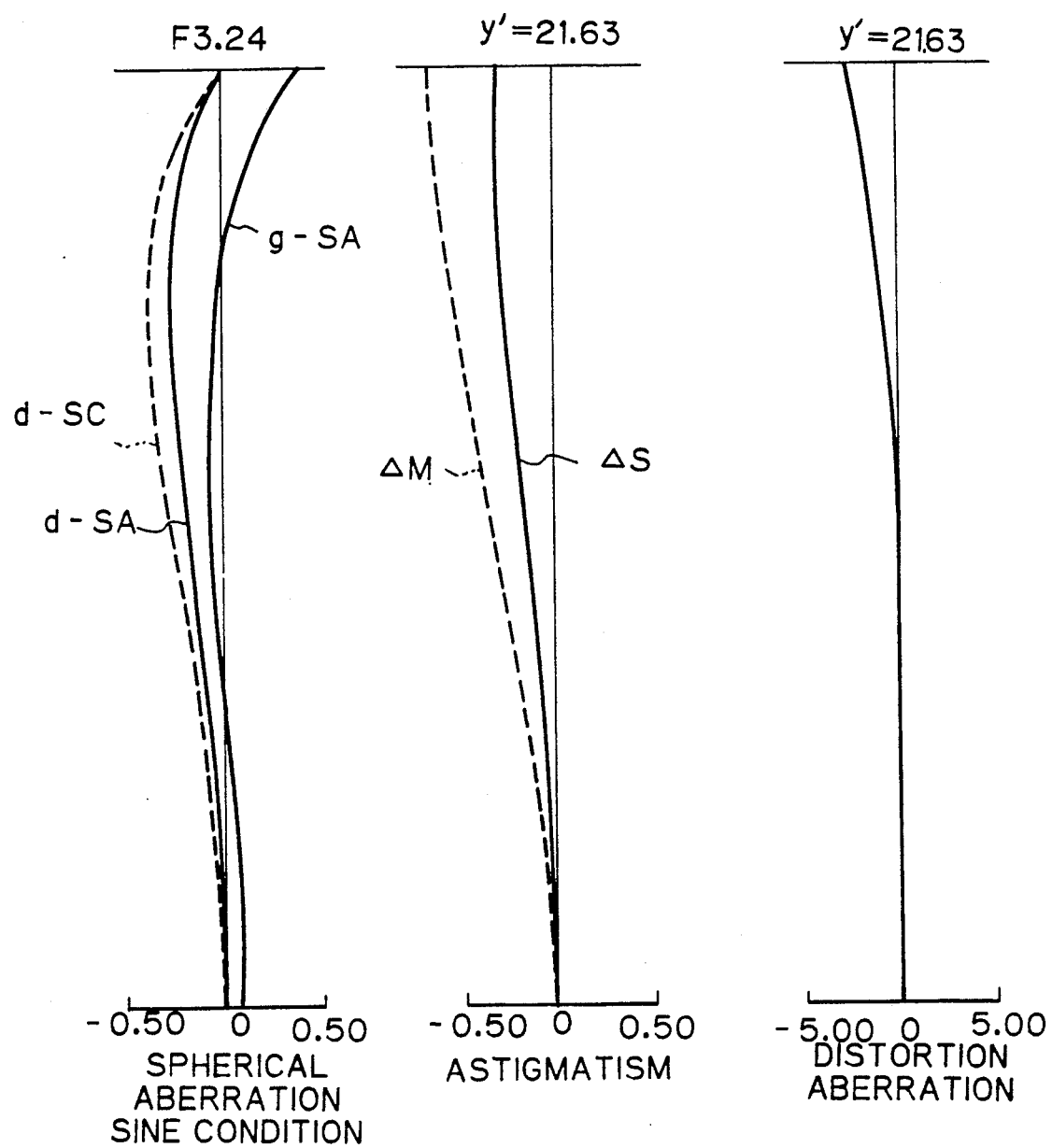
Figure 13:
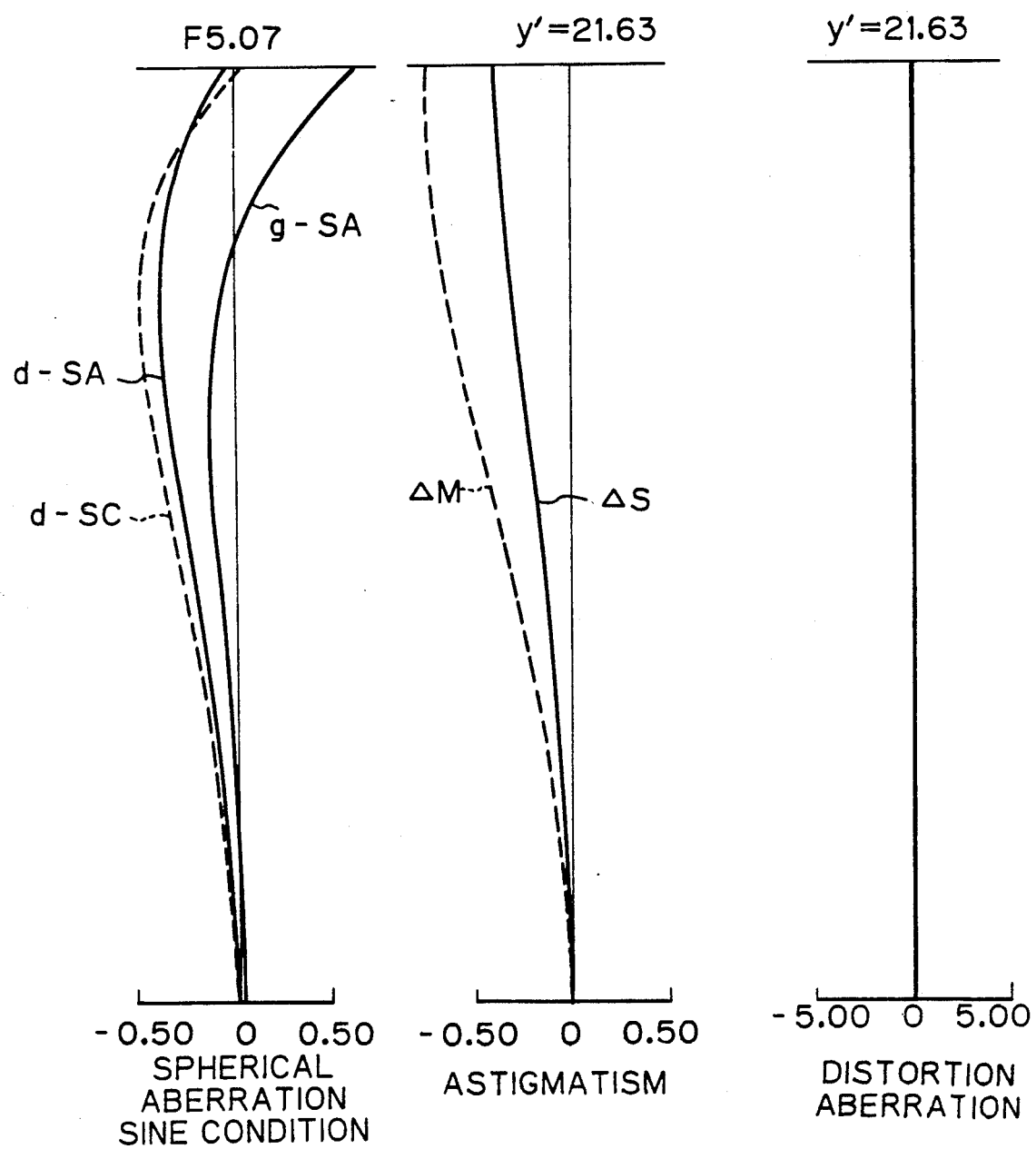
Figure 13:
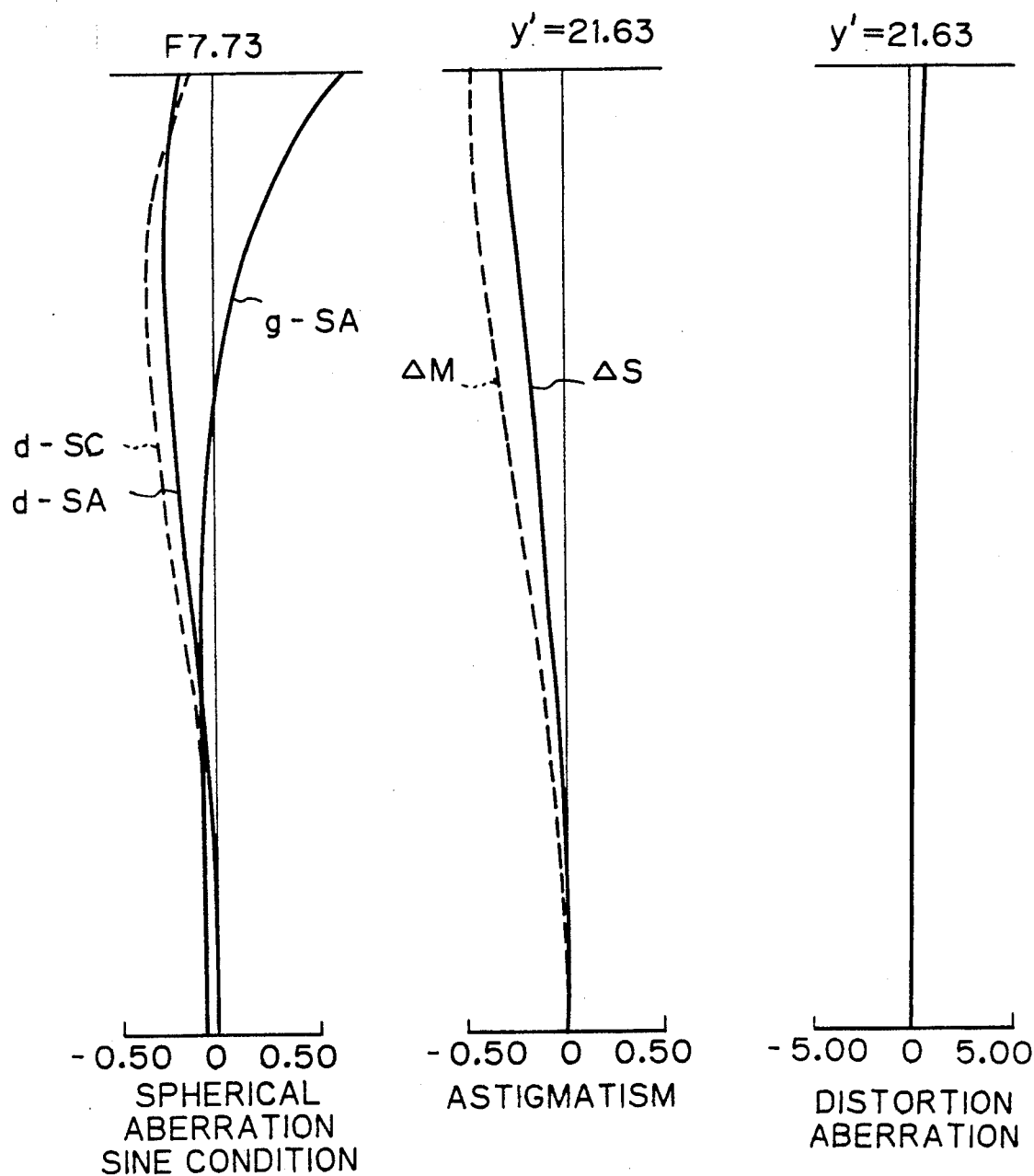

FIGS. 12 and 13 are aberration diagrams with respect to the Embodiment 3. FIG. 12a is an aberration diagram at the focusing time of the infinity at the wide angle end of the first zoom region. FIG. 12b is an aberration diagram at the focusing time of the infinity at the wide angle end of the second zoom region. FIGS. 12c and 12d are respectively aberration diagrams at the focusing time of the infinity in an intermediate portion of the second zoom region and at the telescopic end thereof. FIGS. 13a to 13d are respectively aberration diagrams in the focusing state in which the distance of the object is set to 1 m in the aberration states of FIGS. 12a to 12d.

As a comparison example, lens group distances $d_4$ and $d_{13}$ are shown as follows when the front focusing system is also used in the first zoom region in the above Embodiments 1 to 3 and the focusing operation is performed such that the distance of the object is set to 1 m.

| distance of object | | Embodiment 1 | Embodiment 2 | Embodiment 3 |
|---|---|---|---|---|
| ∞ | f | 30.944 | 30.943 | 30.943 |
| 1m | $d_4$ | 24.778 | 23.516 | 21.641 |
|   | $d_{13}$ | 13.752 | 12.344 | 12.662 |

Figure 14:
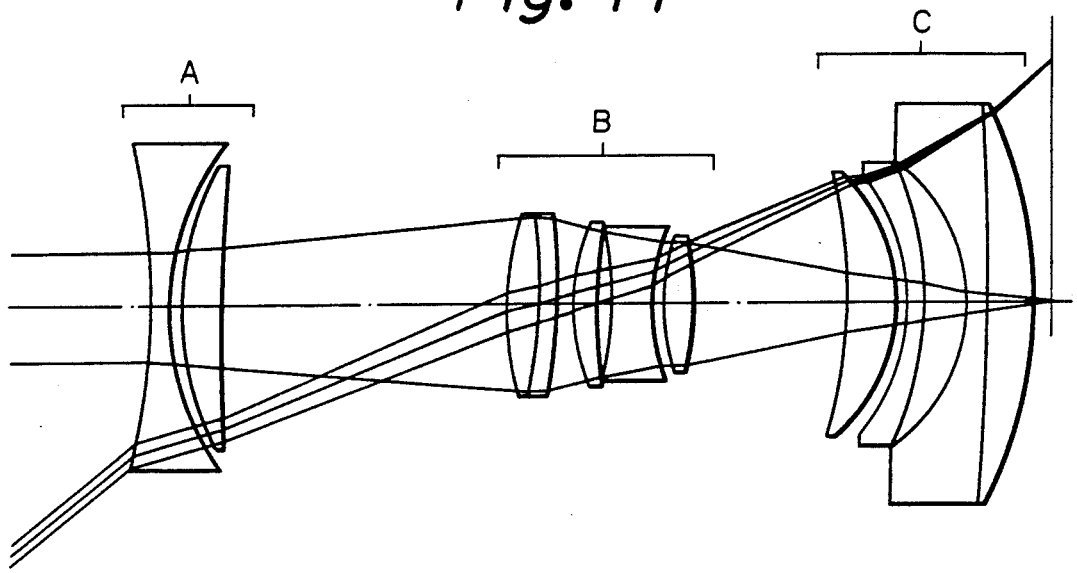
Figure 16:
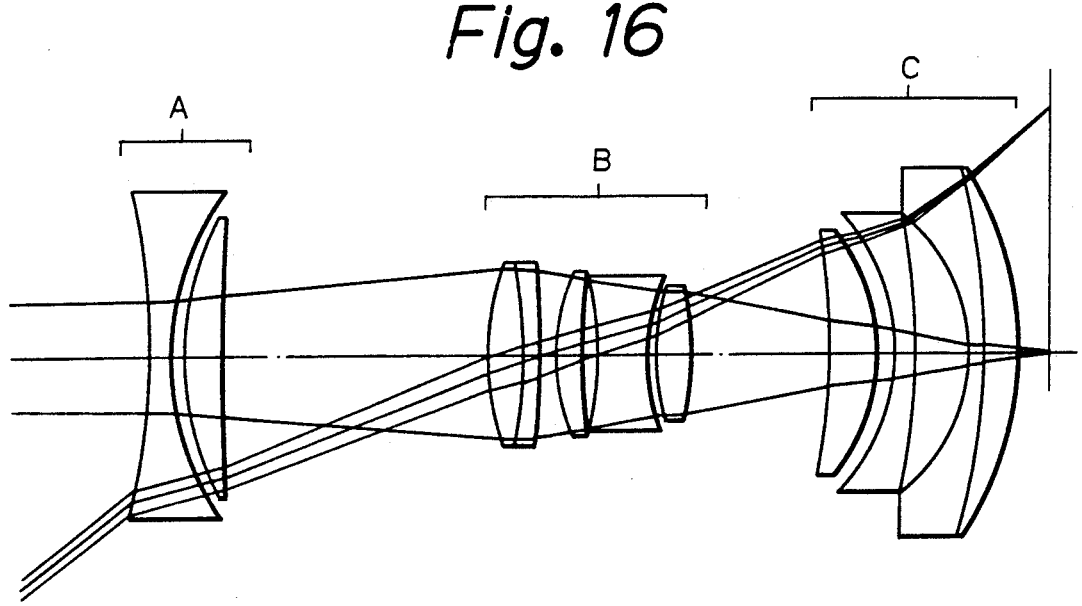
Figure 18:
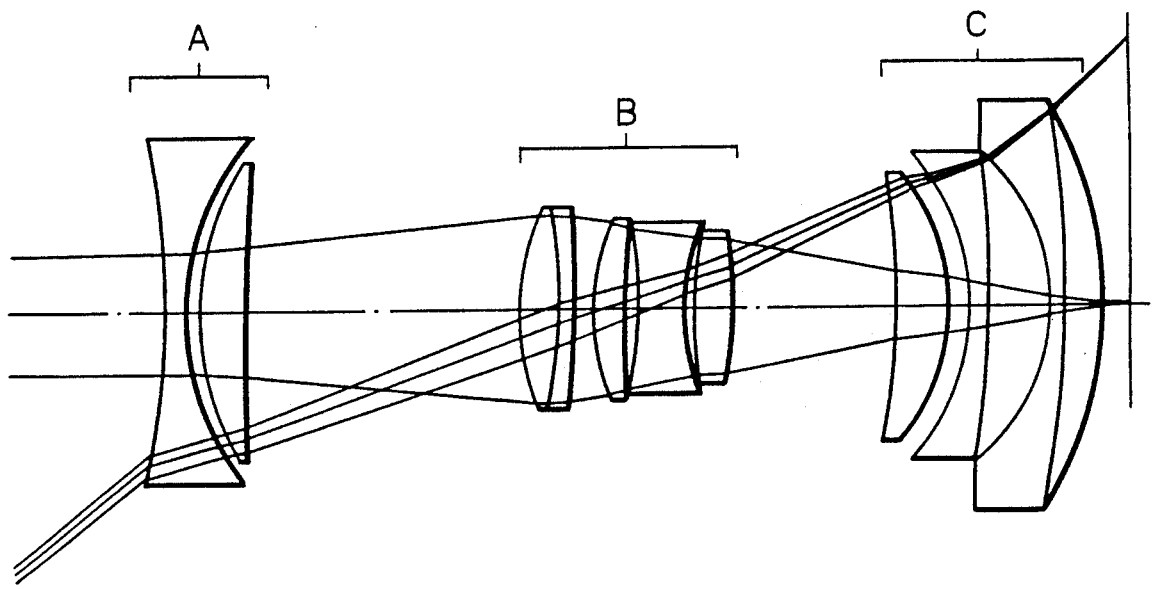
FIGS. 18 and 19 are views for explaining a comparison example with respect to Embodiment 3.
Figure 19:
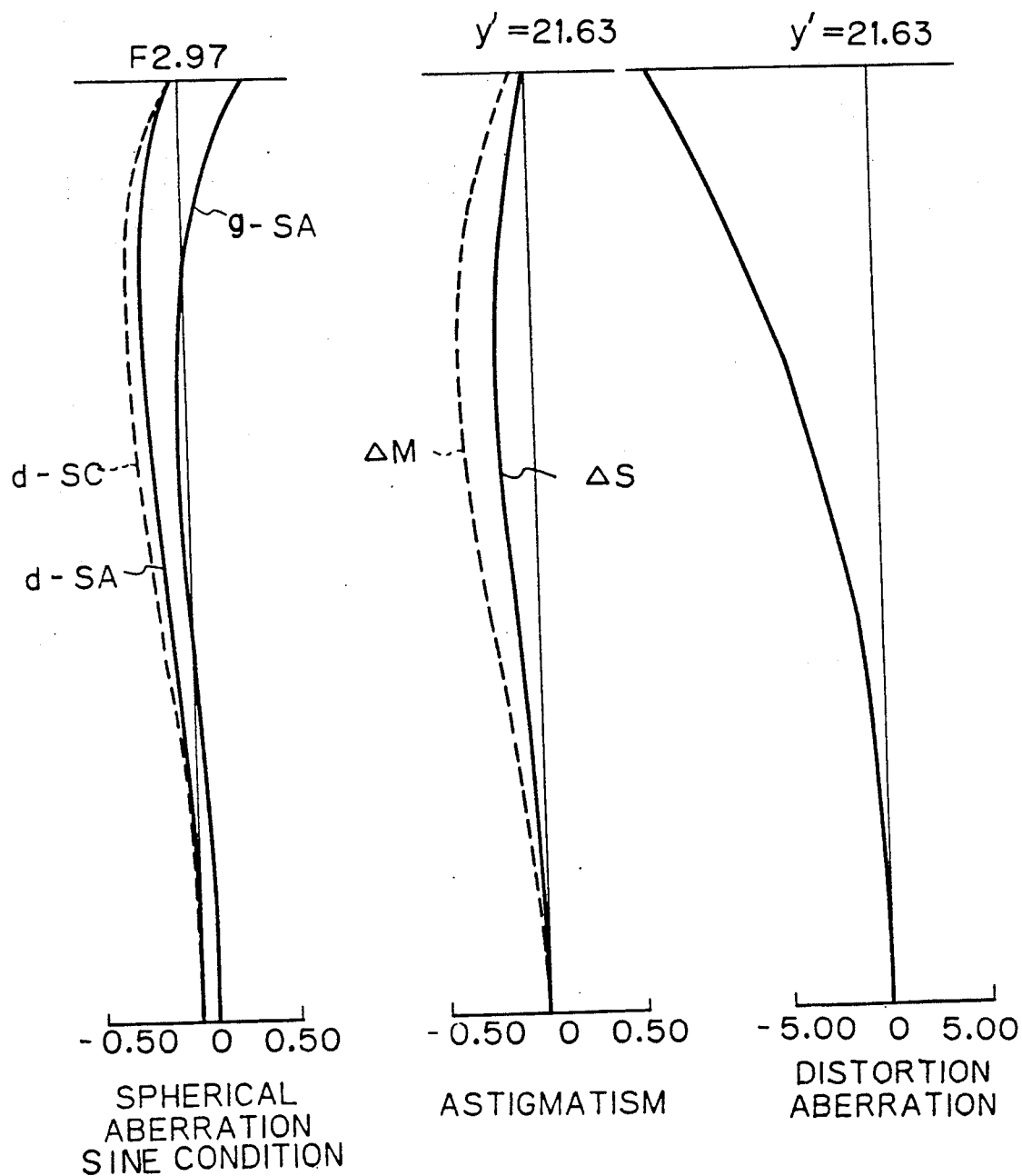

FIG. 14 shows the lens construction and the light beam on the optical axis and the peripheral light beam closest thereto in the focusing state in which the first lens group is moved in the direction of the object to set the distance of the object as 1 m at the wide angle end of the first zoom region with respect to an example corresponding to the Embodiment 1 in the above comparison example. FIGS. 16 and 18 respectively show the lens construction and the light beam on the optical axis and the peripheral light beam closest thereto with respect to examples corresponding to the Embodiments 2 and 3. FIGS. 15, 17 and 19 are aberration diagrams corresponding to FIGS. 14, 16 and 18.

As can be seen from the comparison of the respective Embodiments and the above corresponding comparison example by the figures showing optical paths and aberrations, when the inner focusing system is used in the first zoom region as in the second embodiment, the distortion aberration is small and the vignetting factor is large in comparison with the case in which the front focusing system is used in the first zoom region.

As mentioned above, the present invention can provide a novel zoom lens and a novel focusing method. With respect to this zoom lens, the first zoom region is disposed in addition to the second zoom region as the normal zoom region as mentioned above so that the wide angle region can be enlarged and the zoom ratio can be increased and the zoom lens can be made compact. Further, the inner focusing system is used in the first zoom region and the front focusing system is used in the second zoom region so that a preferable focusing operation can be realized in the respective zoom regions.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom lens system comprising:
    first to third lens groups sequentially arranged from an object side toward an image side and respectively having negative, positive and negative focal distances;
    a first means for performing a zooming operation in a first zoom region from a wide angle end of the first zoom region to a telescopic end of the first zoom region by moving at least the first lens group toward the image side; and
    a second means for performing the zooming operation in a second zoom region from the telescopic end of said first zoom region to a telescopic end of the second zoom region by moving all the lens groups from the telescopic end of said first zoom region toward the object side while changing the distances between the lens groups with respect to each other,
    the focal distances of the entire lens system at the wide angle end satisfying the following inequality conditions:

$$0.3 < |f_3|/|f_1| < 1 \qquad (I)$$

$$1.2 < |f_1|/f_w < 2.3 \qquad (II)$$

$$0.9 < |f_3|/f_w < 1.4 \qquad (III)$$

when the focal distance of the i-th lens group (i = 1, 2, 3) is set to $f_i$ and the focal distance of the entire lens system at a wide angle end in the second zoom region is set to $f_w$.

2. A zoom lens system according to claim 1, further including means for moving the second lens group on an optical axis in the first zoom region to achieve a focusing of the zoom lens system.

3. A zoom lens system according to claim 2, further including means for moving the first lens group on an optical axis in the second zoom region to achieve the focusing of the zoom lens system.

4. A zoom lens system according to claim 2, wherein an inner focusing system is used in the first zoom region and a front focusing system is used in the second zoom region.

5. A focusing method for a zoom lens having three lens groups and first and second zoom regions comprising the steps of:
   arranging first to third lens groups from an object side toward an image side wherein the lens groups respectively have negative, positive, and negative focal distances;
   performing a zooming operation in a first zoom region by moving at least the first lens group toward the image side;
   performing a zooming operation in a second zoom region by moving all the lens groups toward the object side while changing the distances between the lens groups;
   performing a first focusing operation by moving the second lens group on an optical axis in the first zoom region; and
   performing a second focusing operation by moving the first lens group on the optical axis in the second zoom region.

6. The method according to claim 5, wherein said first focusing operation includes the additional step of:
   using an inner focusing system to move the second lens group on an axis in the first zoom region; and wherein said second focusing operation includes the additional step of
   using a front focusing system to move the first lens group on the optical axis in the second zoom region.

* * * * *